(12) United States Patent
Purre et al.

(10) Patent No.: US 11,604,793 B2
(45) Date of Patent: Mar. 14, 2023

(54) METHOD AND APPARATUS FOR GENERATING STRUCTURED RELATION INFORMATION BASED ON A TEXT INPUT

(71) Applicant: SAMSUNG ELECTRONICS CO., LTD., Suwon-si (KR)

(72) Inventors: Naresh Purre, Bangalore (IN); Shubham Vatsal, Bangalore (IN); Sukumar Moharana, Bangalore (IN); Debopriya Shukla, Bangalore (IN); Benu Madhab Changmai, Bangalore (IN); Sreevatsa Dwaraka Bhamidipati, Bangalore (IN); Bhan Natasha, Bangalore (IN); Tripuramallu Sanjana, Bangalore (IN); Sriram Shashank, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 63 days.

(21) Appl. No.: 16/927,500

(22) Filed: Jul. 13, 2020

(65) Prior Publication Data

US 2021/0011912 A1    Jan. 14, 2021

(30) Foreign Application Priority Data

Jul. 12, 2019   (IN) .............................. 201941028125
Jul. 9, 2020    (IN) .............................. 201941028125

(51) Int. Cl.
*G06F 16/2452*   (2019.01)
*G06F 16/35*     (2019.01)
(Continued)

(52) U.S. Cl.
CPC ........ *G06F 16/24522* (2019.01); *G06F 16/23* (2019.01); *G06F 16/35* (2019.01); *H04L 67/535* (2022.05); *H04L 67/564* (2022.05)

(58) Field of Classification Search
CPC .... G06F 16/24522; G06F 16/23; G06F 16/35; G06F 16/338; G06F 40/279; H04L 67/22;
(Continued)

(56) References Cited

U.S. PATENT DOCUMENTS 9,117,447 B2 * 8/2015 Gruber ................ G10L 15/1815
10,678,830 B2 * 6/2020 Li ......................... G06N 3/0445
(Continued)

FOREIGN PATENT DOCUMENTS

EP       3 171 308 A1        5/2017
KR    1020090110080 A       10/2009
(Continued)

OTHER PUBLICATIONS

Johnson, Effective Use of Word Order for Text Categorization with Convolutional Neural Networks, pp. 1-10 (Year: 2015).*
(Continued)

*Primary Examiner* — Albert M Phillips, III
(74) *Attorney, Agent, or Firm* — Sughrue Mion, PLLC

(57) ABSTRACT

A method of generating structured relation information in an electronic device may include: classifying a first text input received by at least one application installed on the electronic device, into at least one category; extracting, from the first text input, a first entity representing a context of the first text input; generating structured relation information by associating the first entity extracted from the first text input, with a second entity extracted from at least one second text input stored in the electronic device or a server; and displaying the structured relation information on the electronic device.

17 Claims, 24 Drawing Sheets

(51) Int. Cl.
   *G06F 16/23*    (2019.01)
   *H04L 67/50*    (2022.01)
   *H04L 67/564*   (2022.01)

(58) Field of Classification Search
   CPC ............... H04L 67/2819; H04L 67/26; H04L 67/535; H04L 67/564; H04L 67/55; G06Q 10/107; G06Q 30/0207
   See application file for complete search history.

(56) References Cited

U.S. PATENT DOCUMENTS

| | | |
|---|---|---|
| 2007/0174115 A1 | 7/2007 | Chieu et al. |
| 2018/0034755 A1 | 2/2018 | Saoji et al. |
| 2019/0122001 A1* | 4/2019 | Bradley ............... H04W 12/08 |

FOREIGN PATENT DOCUMENTS

| | | |
|---|---|---|
| KR | 1020150059682 A | 6/2015 |
| KR | 1020150138590 A | 12/2015 |
| WO | 2013188376 A1 | 12/2013 |

OTHER PUBLICATIONS

Gu, Recent advances in convolutional neural networks, pp. 354-377 (Year: 2018).*
Lai, Recurrent Convolutional Neural Networks for Text Classification, pp. 22672273 (Year: 2015).*
Wang, Semantic Clustering and Convolutional Neural Network for Short Text Categorization, pp. 352-357 (Year: 2015).*
"Global forecast for RCS growth", GSMA, Global Launches—Future Networks, retrieved Jul. 13, 2020, 5 pages total, https://www.gsma.com/futurenetworks/rcs/global-launches/.
"A2P Business Messages to Reach 3.5 Trillion by 2023, AS RCS & OTT Technologies Gain Traction", Juniper Research, Mar. 6, 2019, 2 pages total, https://www.juniperresearch.com/press/press-releases/a2p-business-messages-toreach-3-5-trillion.
International Search Report (PCT/ISA/210) and Written Opinion (PCT/ISA/237) dated Oct. 20, 2020 issued by the International Searching Authority in International Application No. PCT/KR2020/009194.
Communication dated Aug. 2, 2022 by the European Patent Office in European Patent Application No. 20840419.4.

* cited by examiner

FIG. 2C

Dear Mr. Kumar: Your Airline PNR is B59PGI for SG 722 on 03 Oct 2019 (VNS-BLR: 0910-1140). To check flight status and to enhance your travel experience with special add-on products like luxury seats with extra legroom, meals etc. and several other useful products, log on to http://www.xyzairlines.co View all  >

FIG. 2D

SHOPPING
ABCD BANK

Valid Till
10-10-2020

DESCRIPTION: BUY 1 GET 4 FREE

BUY 1 GET 4 FREE clearance sale is live | 9th-10th October 10% instant discount on ABCD bank cards! Http://shopping.co....

Avail Offer  >

FIG. 3F1
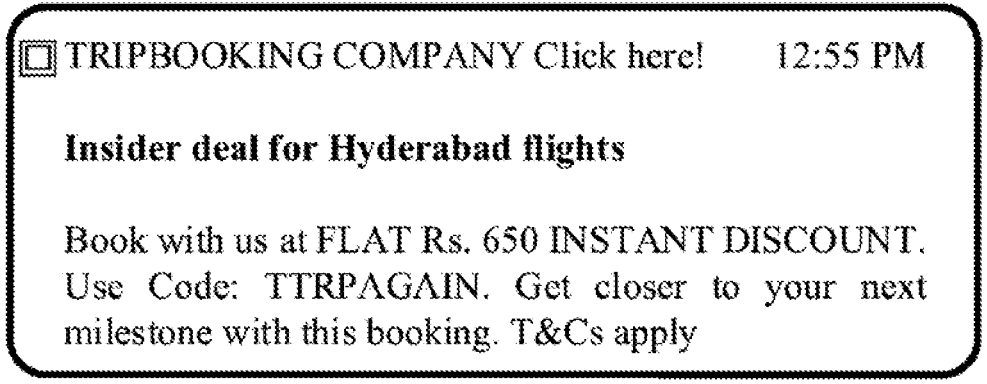
FIG. 3F2
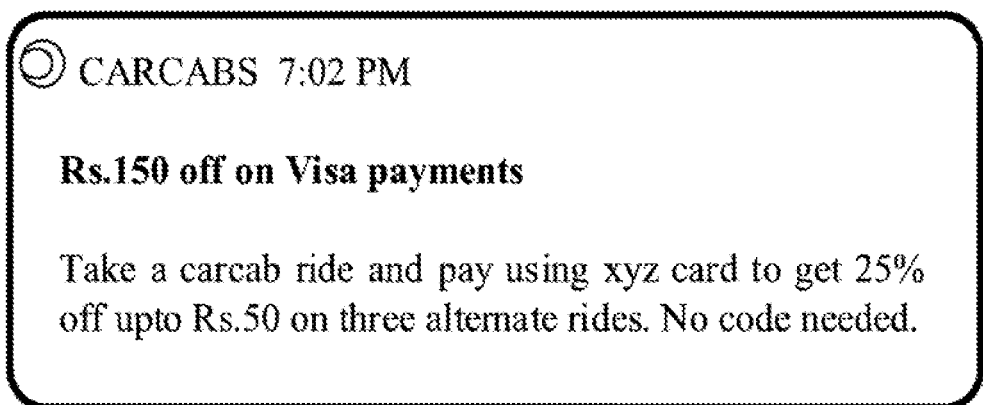

FIG. 3H1
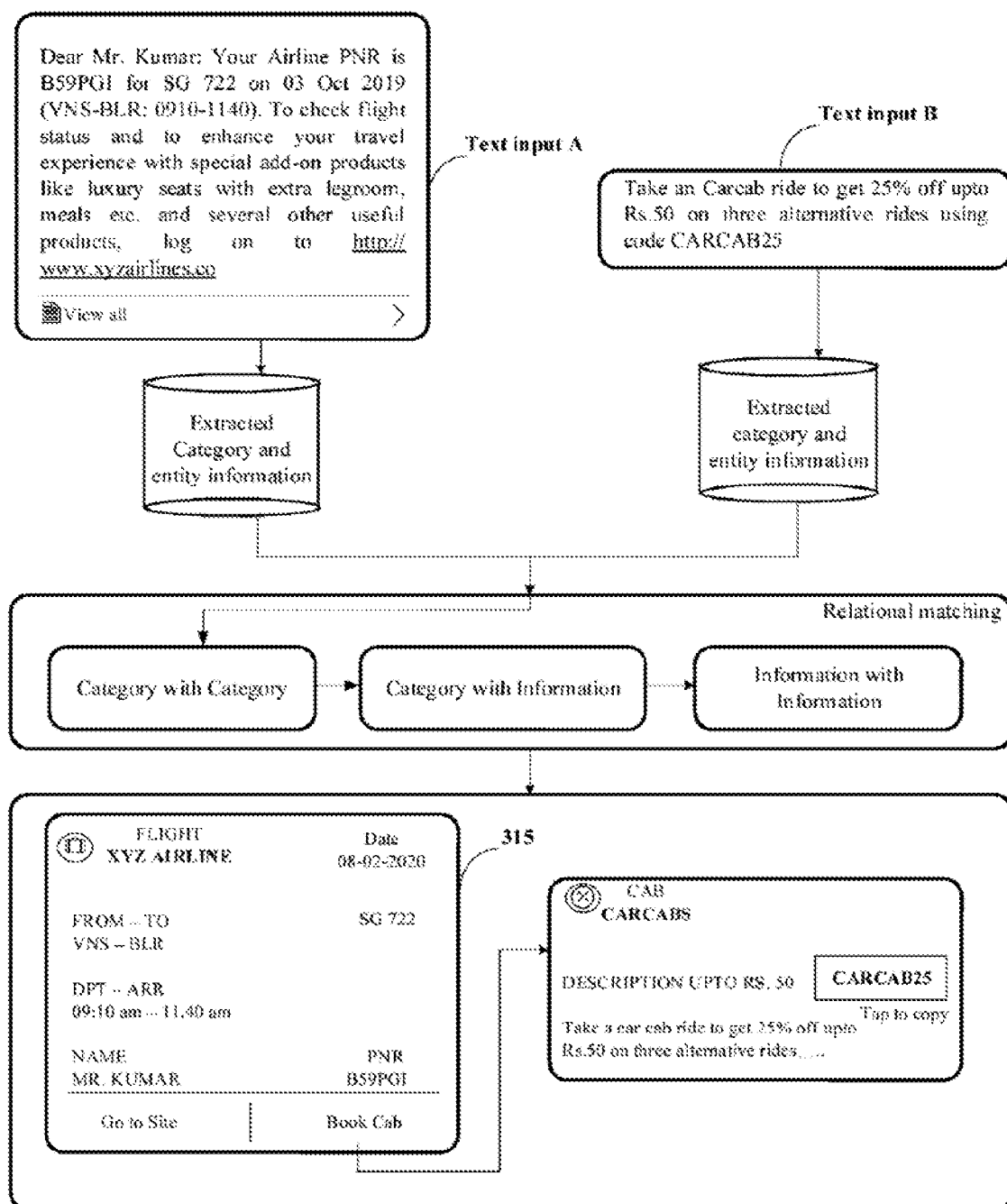

FIG. 3H2
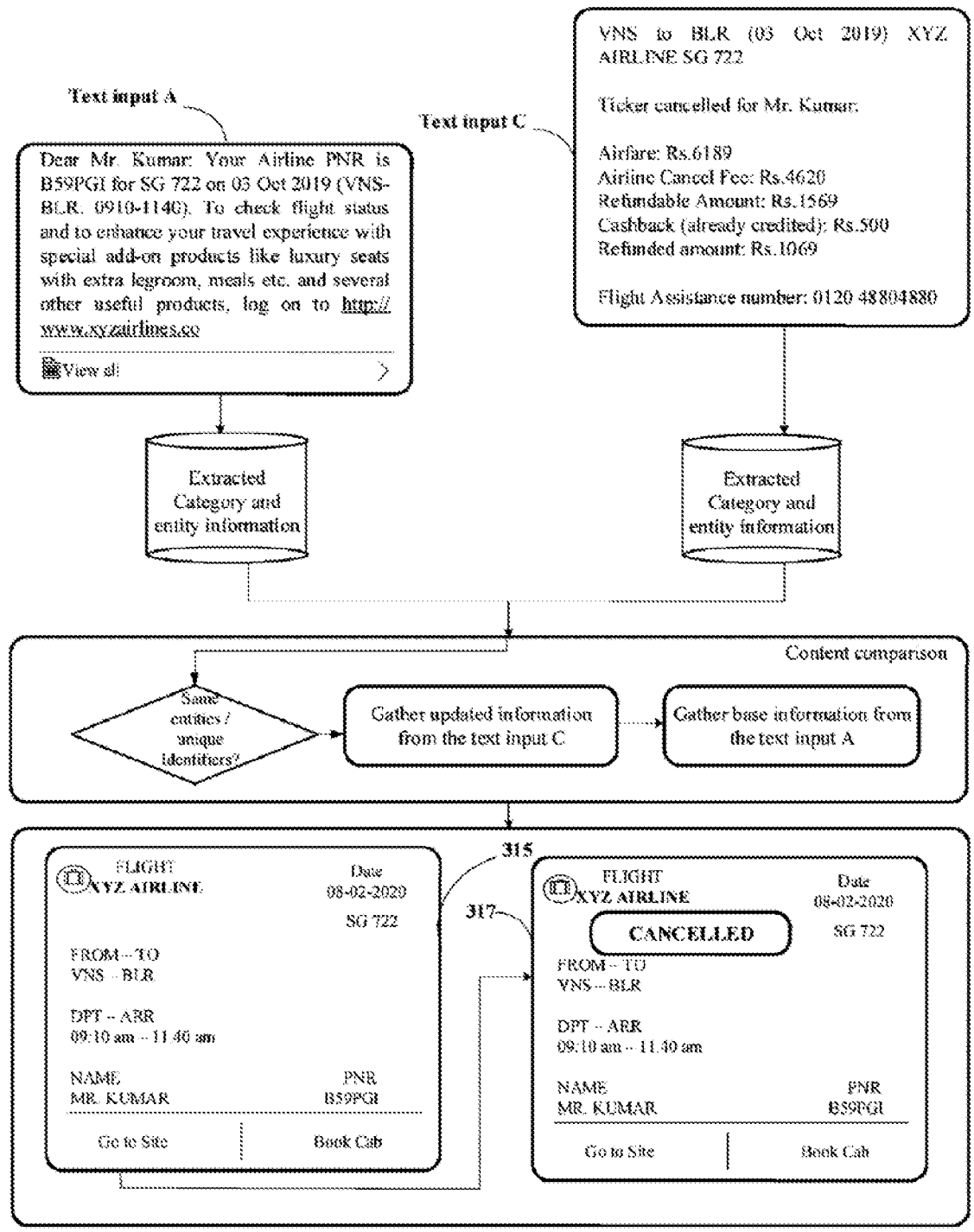

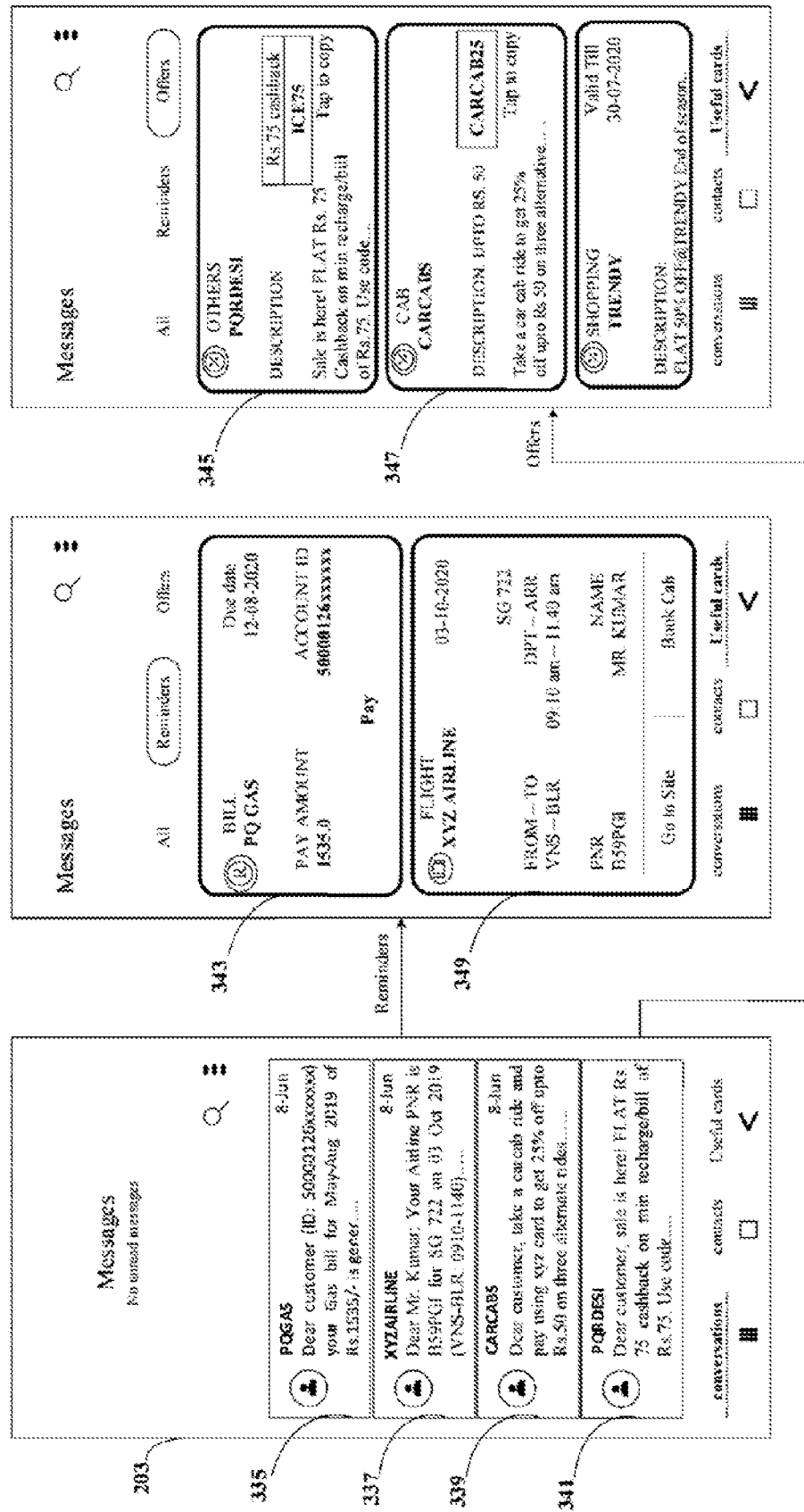
FIG. 3I1

FIG. 3I2
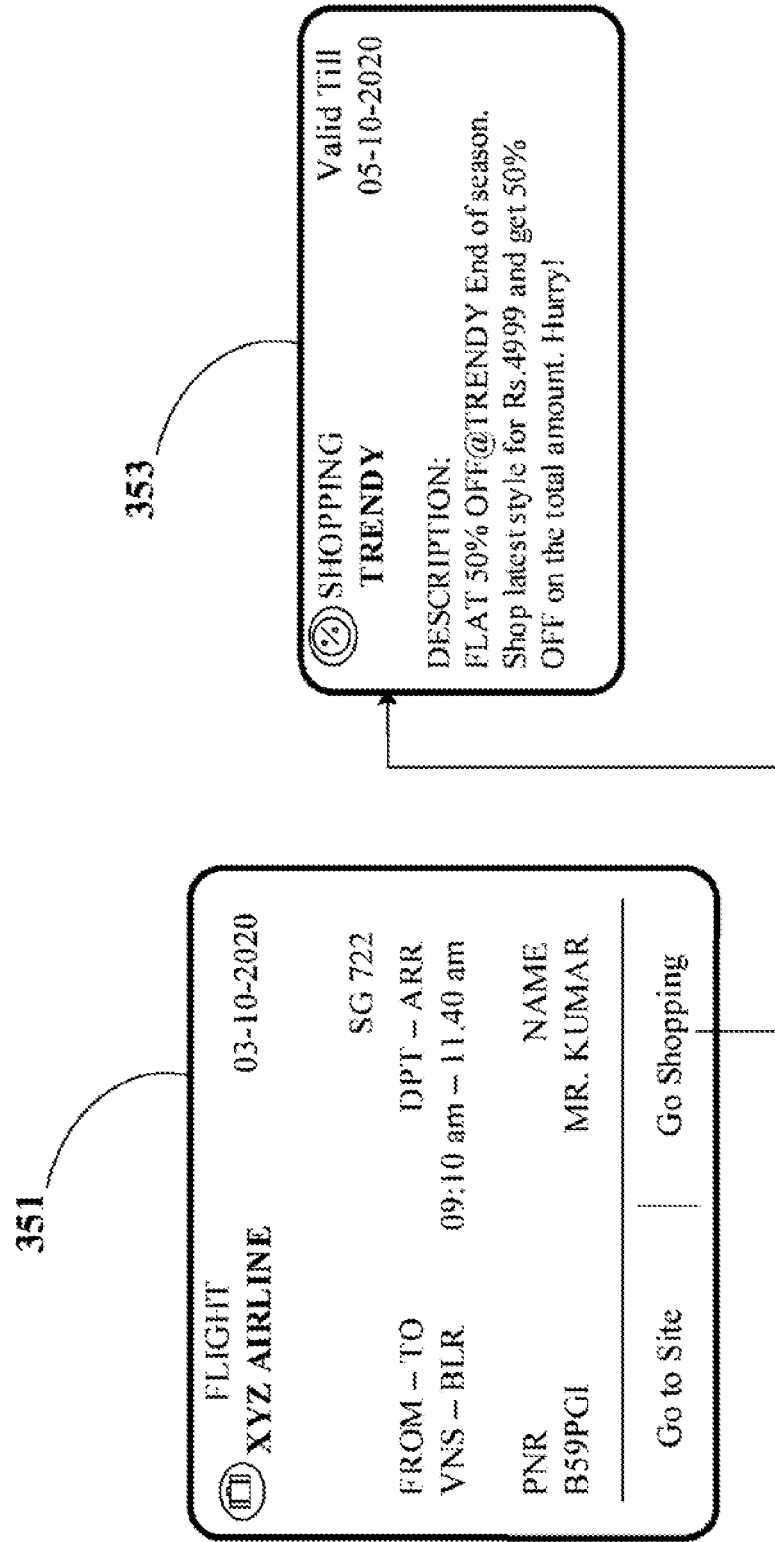

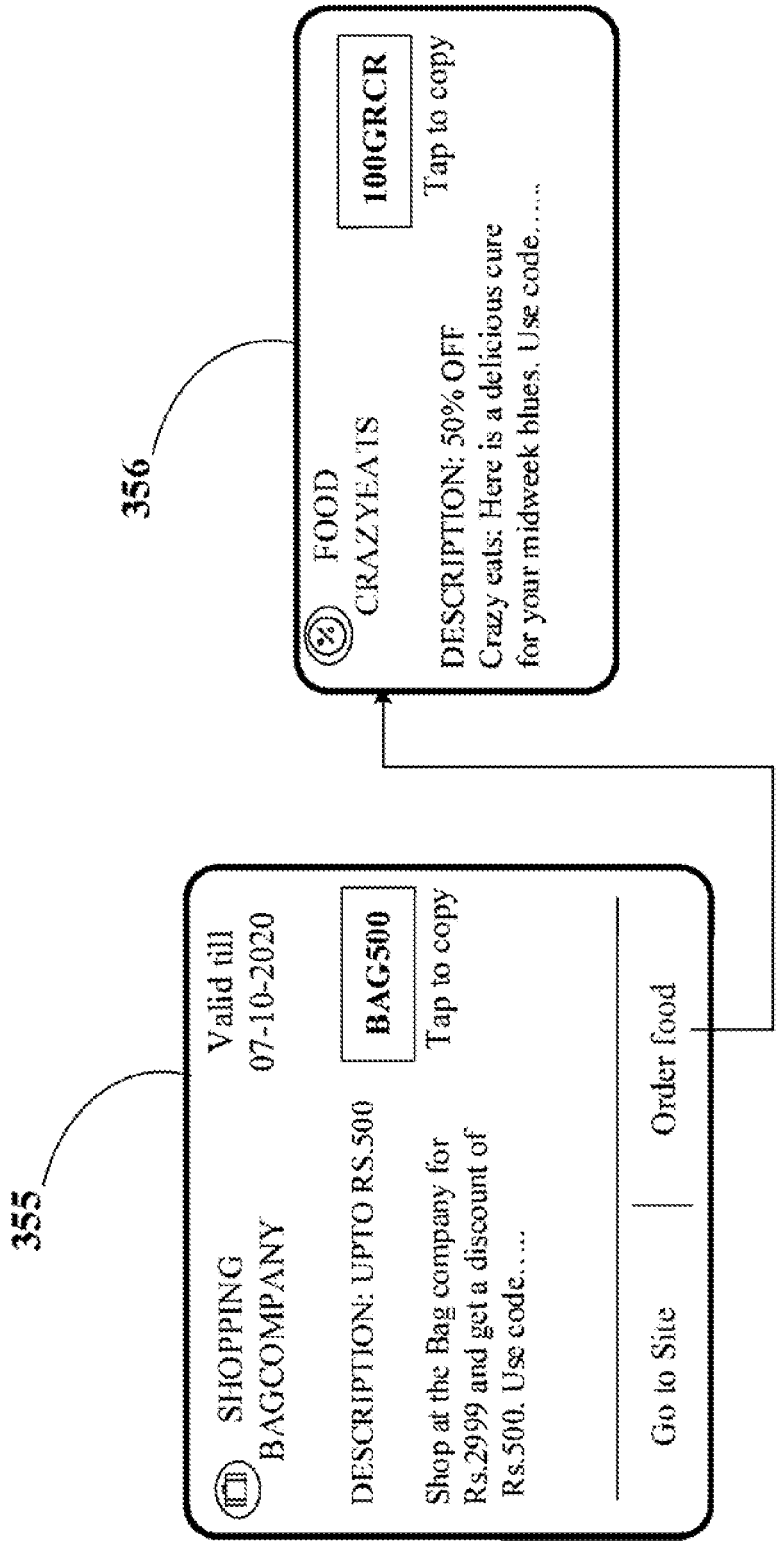
FIG. 3I3

FIG. 3J1

| Sl.no | id | Convers ation_id | Msg type | Recipient | Msg_key type | Msg status | Subject | Snippet | Created Timestamp | Sent timestamp | Sort timestamp |
|---|---|---|---|---|---|---|---|---|---|---|---|
| 1 | 14 | 13 | 10 | PQRDESI | 100 | 1205 | <null> | Dear customer, sale is here! FLAT Rs. 75 cashback on min recharge bill of Rs.75. Use code ICE75 to avail the offer. | 1571404679 | 1571404000 | 1571404672 |
| 2 | 15 | 14 | 10 | XYZAIRLINE | 100 | 1205 | <null> | Dear Mr. Kumar. Your Airline PNR is B69PG1 for SG 722 on 03 Oct 2019 (YYS-BLR-0918-1140). To check flight status and to enhance your travel experience with special add-on... | 1571404873 | 1571404700 | 1571404828 |
| 3 | 16 | 15 | 10 | PQGAS | 100 | 1205 | <null> | Dear customer (ID: 0000126xxxxxx) your Gas bill for May-Aug 2019 of Rs.1535/- is generated. To pay the bill online, please visit... | 1571404898 | 1571404800 | 1571404936 |
| 4 | 17 | 16 | 10 | CABCABS | 100 | 1205 | <null> | Take a cabcab ride and pay using xyz card to get 25% off up to Rs.50 on three alternate rides. No code needed. | 1571404437 | 1571404900 | 1571404243 |

FIG. 3J2

| Slno | Conversation_id | Msg ID | Recipient | Valid date | Offer | Coupon Code | Validity | Copied Pin | Description | Link |
|---|---|---|---|---|---|---|---|---|---|---|
| 1 | Offer_others | 14 | FORDESI | 0 | Rs 75 cashback | ICE75 | 1572631400010 | 0 | Dear customer, sale is here! FLAT Rs. 75 cashback on min recharge bill of Rs.75. Use code ICE75 to avail the offer. | frch.in.AL1 |
| 2 | Offer_shopping | 15 | TRENDY | 30-07-2020 | FLAT 50% OFF | 0 | 1572631400010 | 0 | FLAT 50% OFF @ TRENDY END of Season sale. Shop latest style for Rs.4999 and get 50% OFF on the total amount. Hurry! Do not miss this offer. | trw.in.cfds |
| 3 | Offer_cab | 16 | CARCABS0 | | UPTO Rs.50 OFF on three alternative rides | CARCAB15 | 1572631400010 | 0 | Dear customer, take a carcab ride and pay using xyz card to get 25% off upto Rs.50 on three alternate rides. | carcab.in.cffs |

FIG. 3K1
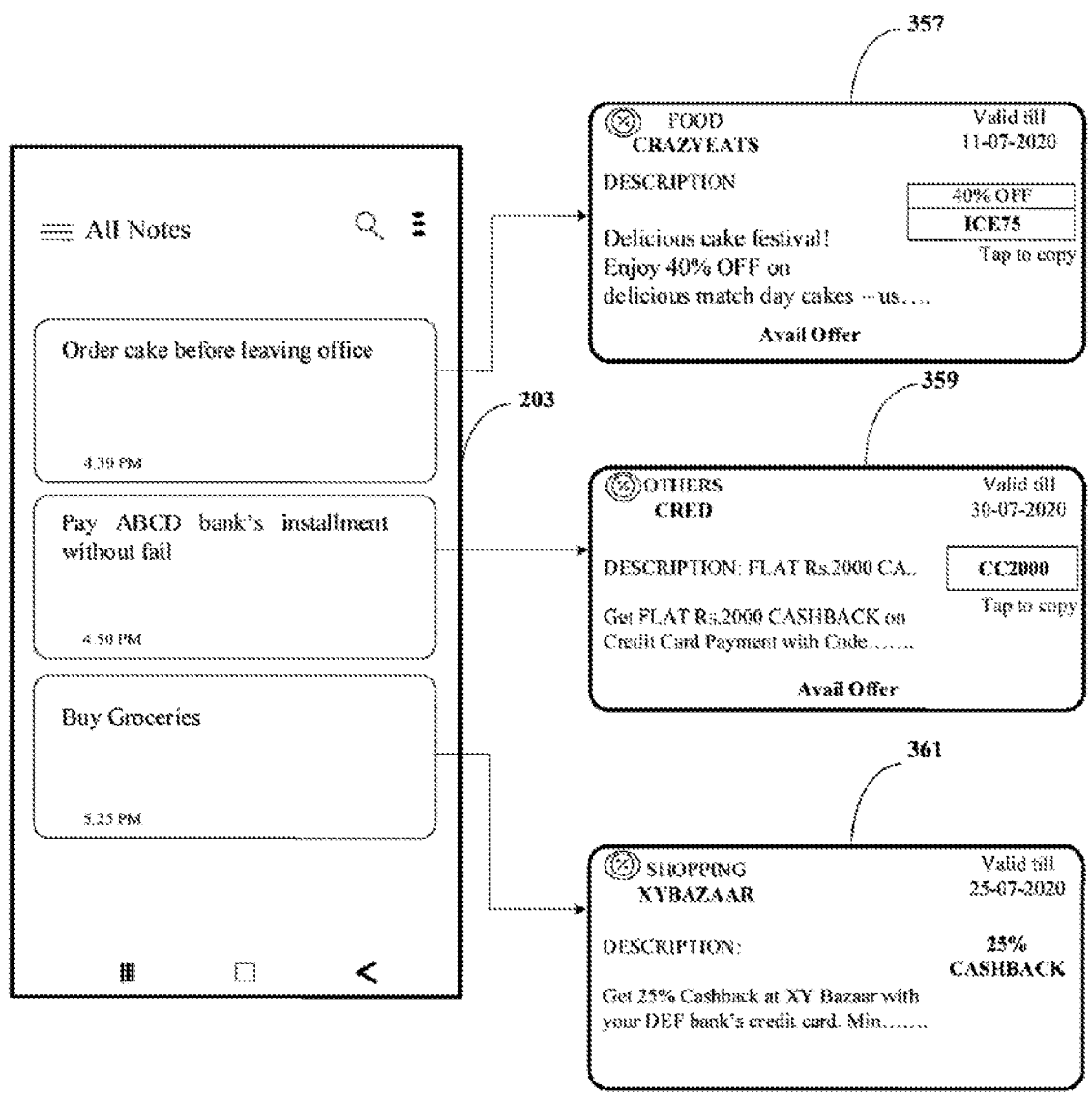

FIG. 3K2
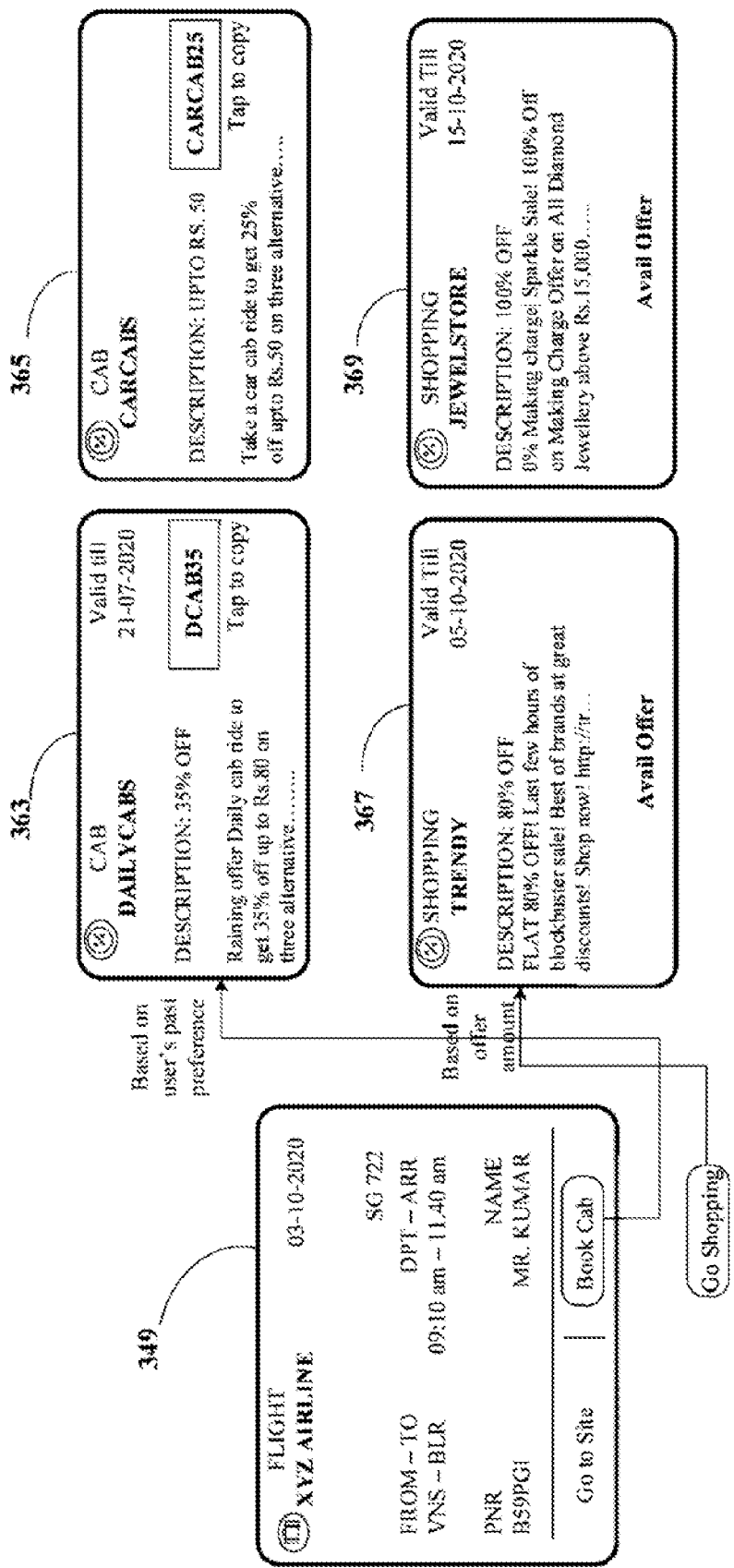

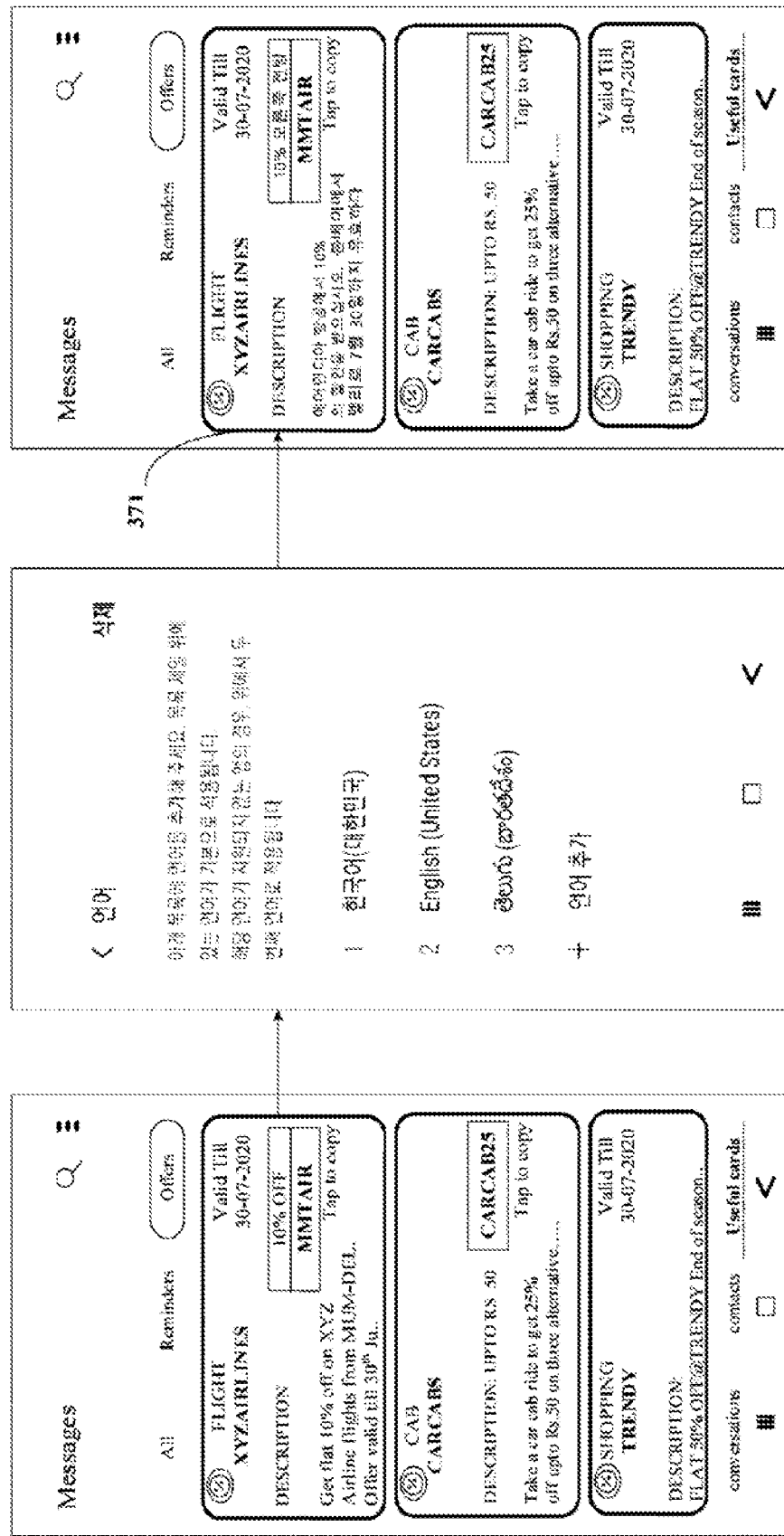
FIG. 3K3

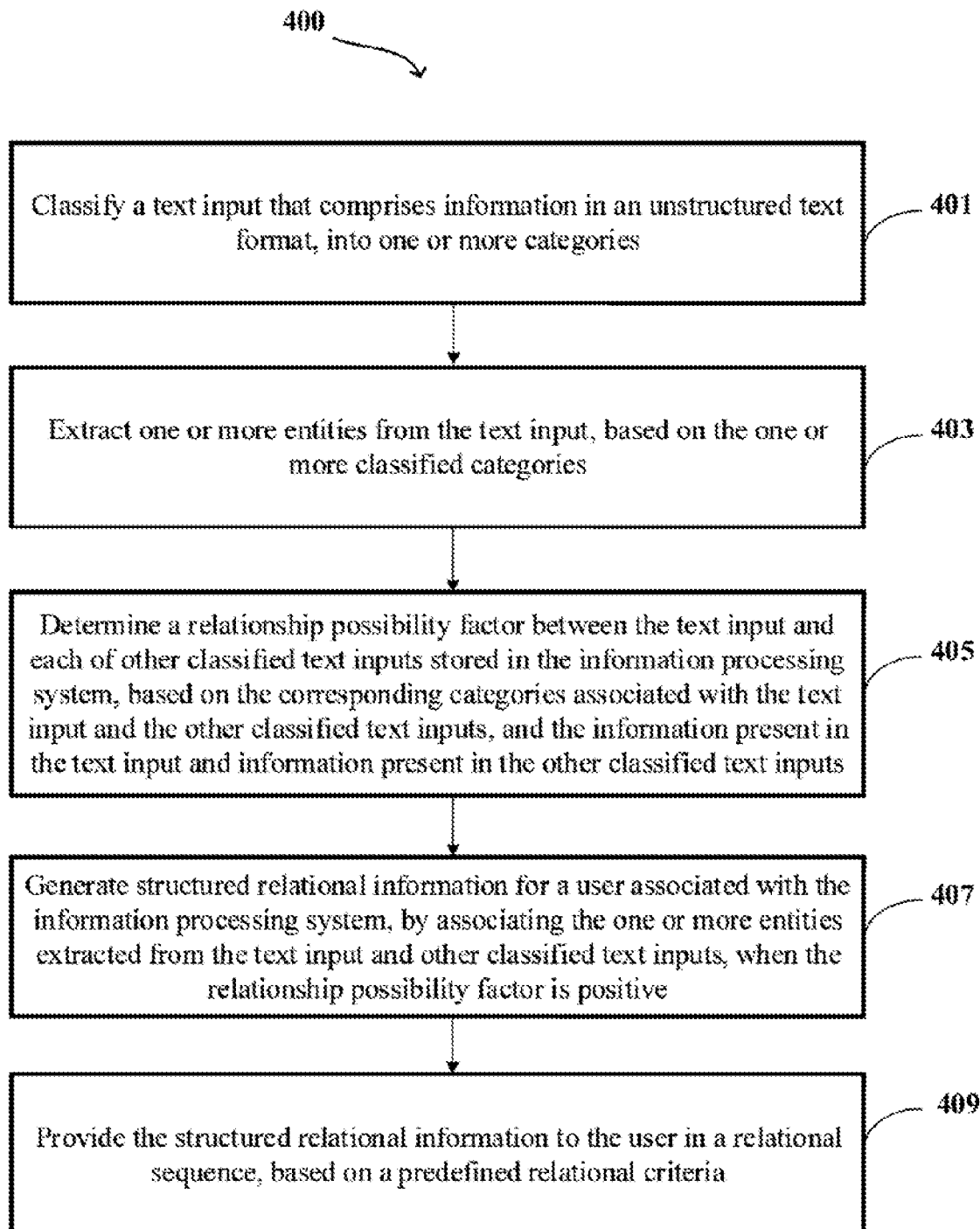

METHOD AND APPARATUS FOR GENERATING STRUCTURED RELATION INFORMATION BASED ON A TEXT INPUT

CROSS-REFERENCE TO RELATED APPLICATION(S)

This application is based on and claims priority under 35 U. S. C. § 119 to Indian Provisional Patent Application No. 201941028125, filed on Jul. 12, 2019, in the Indian Patent Office, and Indian Complete Patent Application No. 201941028125, filed on Jul. 9, 2020, in the Indian Patent Office, the disclosures of which are incorporated by reference herein in their entireties.

BACKGROUND

1. Field

The present disclosure relates to information extraction, and more particularly to a method and an apparatus for generating relation information from unstructured text.

2. Description of Related Art

Generally, extensive usage of online applications these days is leading to generation of abundant data related to the online applications. Such abundant data may be used to perform information extraction and classification, for providing useful and customized insights and recommendations to users of the online applications. However, currently, information extraction is not properly performed due to which the available data is not used to its complete potential. For instance, inbox that stores messages received by the user in a mobile device, is generally a cluttered message inbox. Due to the cluttered nature of the inbox, users find it difficult to identify the required information at the right time. As an example, the inbox may have multiple messages related to offers such as cab offers, food ordering offers, shopping vouchers and the like, along with the personal messages of the user. Due to the large number of messages stored in the inbox, it is not only difficult to find such messages in the cluttered message inbox but, the user may not even be aware of existence of one such offer. Many a times, user may fail to recall about certain offers due to which the offers remain unused and may eventually expire. Also, in many instances, when the user is aware of a certain offer, the user may have to explicitly capture information related to the offer and cross verify with the respective online application to understand current status of the offer, which requires a long process.

Therefore, there exists a need to intelligently classify unstructured text input and provide useful insights to the user, in real-time, by establishing relational association between multiple categories of the text input.

The information disclosed in this background of the disclosure section is only for enhancement of understanding of the general background of the disclosure and should not be taken as an acknowledgement or any form of suggestion that this information forms the prior art already known to a person skilled in the art.

SUMMARY

Provided is a method of generating structured relation information in an electronic device, including: classifying a first text input received by at least one application installed on the electronic device, into at least one category; extracting, from the first text input, a first entity representing a context of the first text input; generating structured relation information by associating the first entity extracted from the first text input, with a second entity extracted from at least one second text input stored in the electronic device or a server; and displaying the structured relation information on the electronic device.

The at least one category of the first text input may include at least one of a schedule reminder, an offer associated with service or products, a transaction, a greeting, an offering of information, a request, and an acknowledgment.

The extracting the first entity from the first text input may include determining, based on the at least one category of the first text input, a relation factor between the first text input and the at least one second text input, and the generating the structured relation information may include generating the structured relation information based on the relation factor.

The determining the relation factor may include detecting a first keyword from the first text input and a second keyword from the at least one second text input; determining an association between the first keyword and the second keyword; and determining the relation factor as a positive value based on the association between the first keyword and the second keyword being detected.

The generating the structured relation information may include generating the structured relation information based on the relation factor being determined to have the positive value.

The detecting the first keyword from the first text input and the second keyword from the at least one second text input may include determining the first keyword based on a first text detected from the first text input, a first synonym corresponding to the first text, or a first word vector generated from word embeddings with the first text; and determining the second keyword based on a second text detected from the at least one second text input, a second synonym corresponding to the second text, or a second word vector generated from word embeddings with the second text.

The determining the relation factor may further include determining the relation factor based on a mapping table, wherein the mapping table may include at least one category association between the at least one category of the first text input and other categories derived by classifying the at least one second text input.

The at least one category association may be generated based on at least one of the association between the first keyword and the second keyword or a statistical analysis of a user's usage of the at least one application in the electronic device over a predetermined period of time.

The displaying the structured relation information may include displaying the structured relation information based on predefined relation criteria, wherein the predefined relation criteria may include at least one of a time, a location of a user of the electronic device, an event extracted from the first text input, or an amount of money extracted from the first text input.

The displaying the structured relation information based on the predefined criteria may include displaying the structured relation information based on a time sequence related to the first text input or the at least one second text input.

The structured relation information may include information extracted from the first text input and the at least one second text input.

The method may further include providing, based on the structured relation information and a current time, suggestion information related to the at least one application in the electronic device.

The first entity may include at least one of: appointment information included in the first text input associated with an appoint reminder, booking information included in the first text input associated with a booking application, time information included in the first text input, location information included in the first text input, contact information included in the first text input, coupon information included in the first text input, payment information included in the first text input, delivery information included in the first text input, transportation information included in the first text input, product provider information included in the first text input, product information included in the first text input, service provider information included in the first text input, or service information included in the first text input.

The method may further include: updating, in real-time, the structured relation information upon receiving information included in the first text input or the at least one second text input.

Among the at least one application, an application associated with the second text input may be different from an application associated with the first text input.

The at least one application may include at least one of a text message application, a chat application, a note application, a memo application, a word-processor application, an alarm application, or a Rich Content Service (RCS) message application.

The displaying the structured relation information may include displaying the structured relation information based on a user profile of a user of the electronic device and contextual parameters.

The user profile may include at least one of a location of the user, user preferences, application usage statistics, a name of the user, or a schedule of the user.

The contextual parameters may include at least one of a location, a schedule, a validity, events of services or products, a name of a person, or predefined statements which are included in the first text input and the at least one second text input.

Provided is an apparatus for generating structured relation information, including: an input and output interface configured to receive a first text input via at least one application; and a processor configured to classify the first text input into at least one category, extract, from the first text input, a first entity representing a context of the first text input, and generate structured relation information by associating the first entity extracted from the first text input, with a second entity extracted from at least one second text input stored in the apparatus or a server, wherein the input and output interface is further configure to display the generated structured relation information.

BRIEF DESCRIPTION OF THE DRAWINGS

The above and/or other aspects will be more apparent by describing certain example embodiments, with reference to the accompanying drawings, in which:

FIG. 2C illustrates an exemplary text input according to an embodiment of the disclosure;

FIG. 2D illustrates exemplary entities from the text input according to an embodiment of the disclosure;

FIG. 3F1 and FIG. 3F2 illustrate exemplary unstructured text inputs received according to an embodiment of the disclosure;

FIG. 3H1 illustrates an exemplary method of generating structured relation information according to an embodiment of the disclosure;

FIG. 3H2 illustrates an exemplary method of updating structured relation information according to an embodiment of the disclosure;

FIG. 3I1, FIG. 3I2 and FIG. 3I3 illustrate exemplary scenarios of generating relation information from unstructured text according to an embodiment of the disclosure;

FIG. 3J1 illustrates an exemplary storage format of unstructured text according to an embodiment of the disclosure;

FIG. 3J2 illustrates an exemplary storage format of classified text input according to an embodiment of the disclosure;

FIG. 3K1 illustrates an exemplary scenario of generating relation information from unstructured notes stored in a user device according to an embodiment of the disclosure;

FIG. 3K2 illustrates an exemplary scenario of selecting best offer from multiple offers for the user according to an embodiment of the disclosure;

FIG. 3K3 illustrates an exemplary scenario of generating relation information in a preferred language of the user according to an embodiment of the disclosure;

FIG. 4 is a flowchart for generating relation information from unstructured text according to an embodiment of the disclosure.

DETAILED DESCRIPTION

Figure 1:
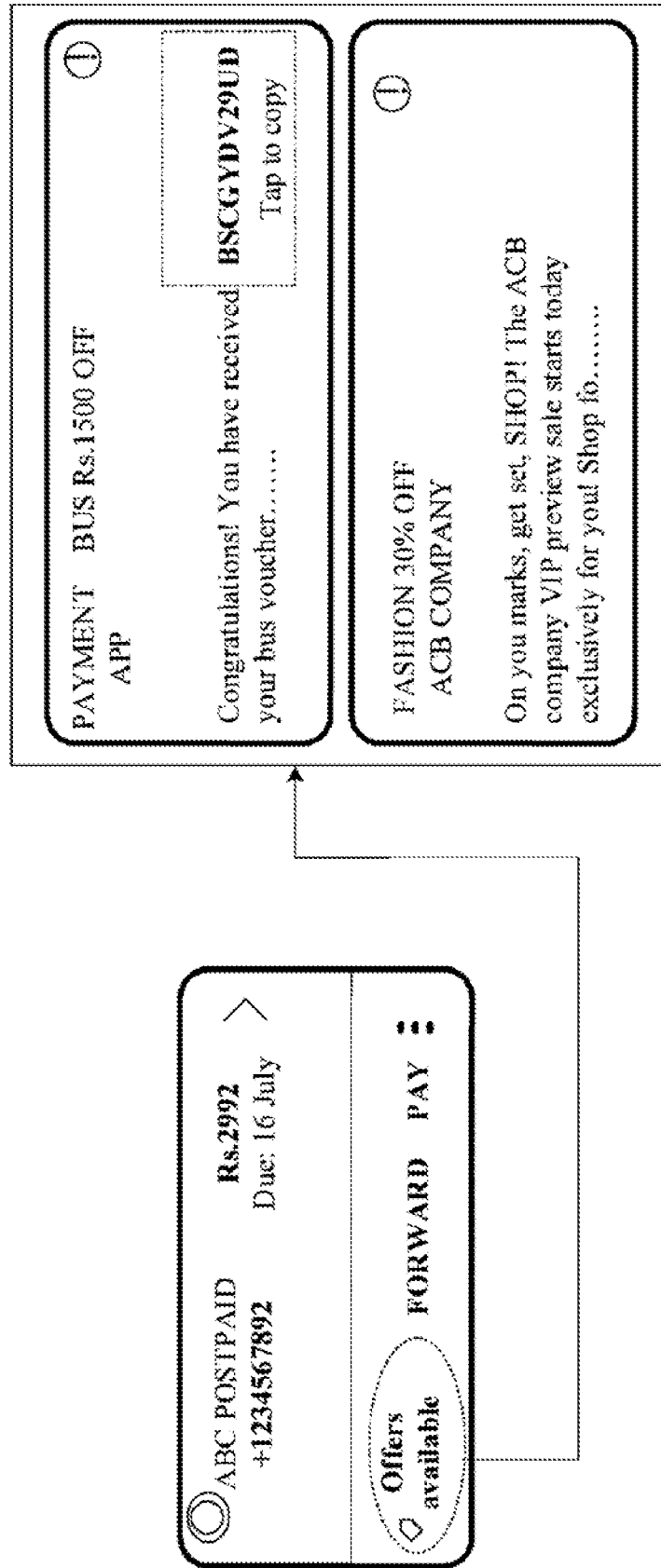
FIG. 1 illustrates an exemplary payment card sequence according to an embodiment of the disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Throughout the entire disclosure, when it is assumed that a certain part includes a certain component, the term 'including' means that a corresponding component may further include other components unless a specific meaning opposed to the corresponding component is written. The term used in the embodiments such as "unit" or "module" indicates a unit for processing at least one function or operation, and may be implemented in hardware, software, or in a combination of hardware and software.

Throughout the disclosure, the expression "at least one of a, b or c" indicates only a, only b, only c, both a and b, both a and c, both b and c, all of a, b, and c, or variations thereof. For example, the expression, "at least one of a, b, and c," should be understood as including only a, only b, only c, both a and b, both a and c, both b and c, all of a, b, and c, or any variations of the aforementioned examples.

Hereinafter, embodiments of the disclosure will be described in detail with reference to the attached drawings to allow those of ordinary skill in the art to easily carry out the embodiments. However, the disclosure may be implemented in various forms, and are not limited to the embodiments described herein. To clearly describe the disclosure, parts that are not associated with the description have been omitted from the drawings, and throughout the specification, identical reference numerals refer to identical parts.

The functions according to the disclosure may be performed through a processor and memory of a mobile device. The processor may include one processor or a plurality of processors. In this regard, the one processor or the plurality of processors may be a general-purpose processor such as a central processing unit (CPU), an application processor (AP), or a digital signal processor (DSP), a graphic processor such as a GPU or a vision processing unit (VPU), or an artificial intelligence processor such as an NPU. The one processor or the plurality of processors control to process input data according to a predefined operation rule or model stored in the memory. Alternatively, when the one processor or the plurality of processors are the artificial intelligence processors, the artificial intelligence processors may be designed to have a hardware structure specialized for processing a specific artificial intelligence model.

In the present disclosure, the word "exemplary" is used herein to mean "serving as an example, instance, or illustration." Any embodiment or implementation of the present disclosure described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Typically, a mobile phone provides a Short Message Service (SMS) organizer that extracts data from SMS messages which are in the form of a predefined SMS template, based on the vendors. However, such techniques cannot perform real-time learning from the SMS to provide useful insights. For instance, consider an exemplary payment card as shown in FIG. 1. This payment card may include multiple categories of information such as payment details and offer details which contains several offers that may or may not be applicable for the payment indicated in the payment card. The existing techniques can only show the payment card to the user, but cannot extract the offer details which are applicable for the payment card, though the offer details are indicated as shown in the FIG. 1, as "offers available". The offers showcase upon clicking on the option "Offer available" are not even applicable or even related to the Post-paid bill payment. Thus, the existing techniques fail to associate the payment details and the offers details, for further processing. Therefore, users may have to perform the tedious job of opening the offer details and reviewing each offer individually, to find an offer which is applicable for the payment. In some cases, instead of performing such tedious task, users may opt to make the payment without looking at the offer details. Further, since, the existing techniques fail to associate the payment details and offer details in the above example, the existing techniques do not provide latest updates related to the offer details or reminders related to offer details that may impact the payment. Additionally, since the existing techniques are dependent on predefined SMS templates, the existing techniques fail to recognize the text inputs which are of a new format or an unknown format, until the template associated with the format is predefined. Thus, the existing techniques perform the tedious task of updating each new format, which is not a feasible option, as the formats keep changing with time.

Throughout the entire disclosure, the term of "relational information" may be interchangeably used with the term of "relation information." The term of "a relationship possibility factor" may be interchangeably used with the term of "a relation factor." The information processing system may be interchangeably used with "an electronic device" or "an apparatus."

Provided are a method and an apparatus for generating relation information from unstructured text. The information processing system classifies a text input which is in an unstructured format into one or more categories. The information processing system may dynamically convert the text input into a template without a need of any predefined templates. Therefore, the disclosure overcomes the disadvantage of categorizing only the text inputs of known predefined formats from a clutter, thereby providing a flexibility of processing the text inputs of unknown formats or new formats. In an embodiment, the one or more categories may include, but not limited to, offer category, reminder category, other category including information text inputs, One Time Password (OTP) text inputs and the like. In an embodiment, the information processing system may classify the text input which includes a brand representing a source of service or products. As an example, all the offer messages related to a brand "ABCD" may be categorized under the title "ABCD". Further, the information processing system may extract one or more entities from each of the classified text inputs using one or more entity parsers applicable for the corresponding category of text input.

The information processing system may generate display cards including a summary of the text input in an intuitive manner based on the determined category and the extracted one or more entities of the text input. In the disclosure, the information processing system generates and provides structured relation information related to content to be recommended to the user, in order to ensure best usage of the recommended content. As an example, consider the user has to pay Internet bill of Rs.1500.

Figure 2A:
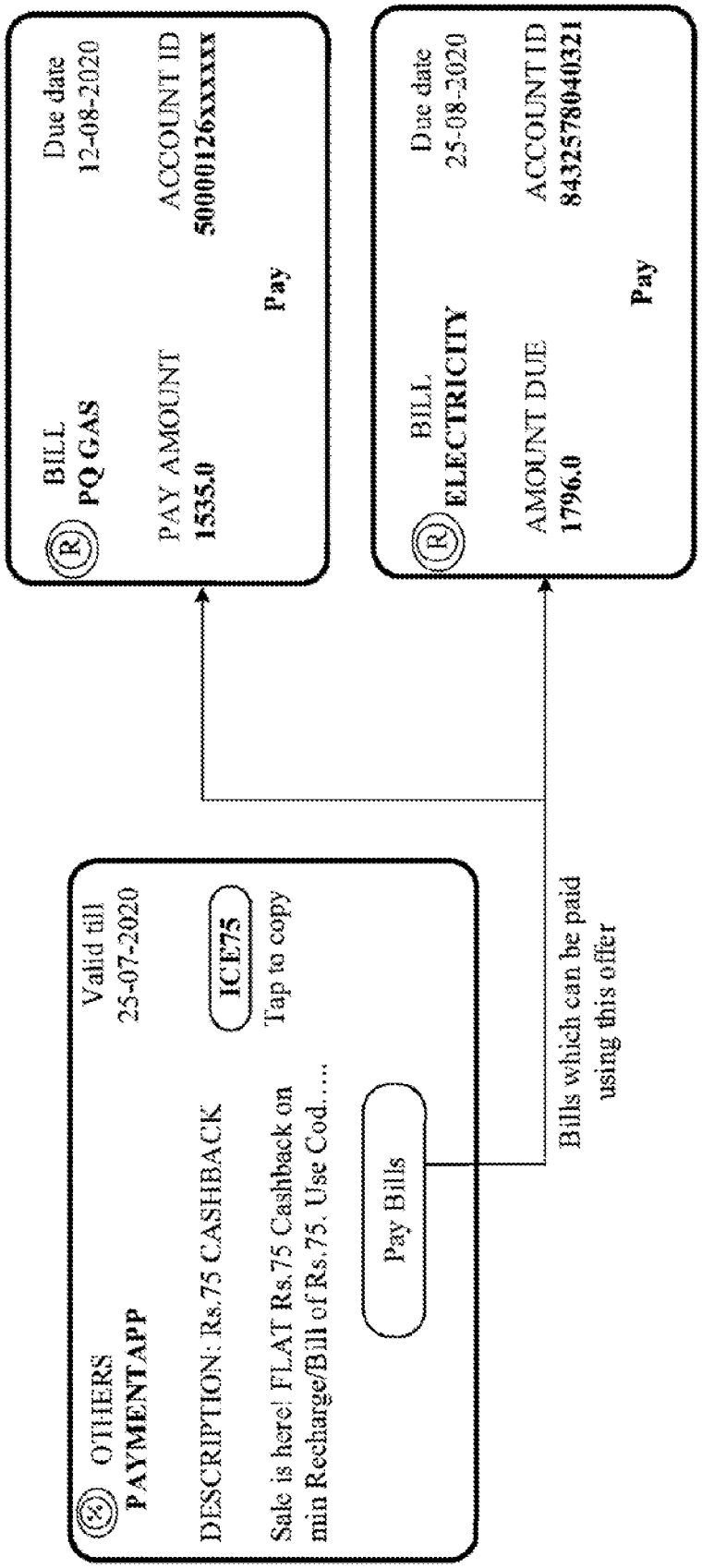
FIG. 2A illustrates an exemplary display card having a composite view according to an embodiment of the disclosure.

FIG. 2A illustrates an exemplary display card having a composite view according to an embodiment of the disclosure.

In an example, there is a display card which captures the offer provided by "PQR Bank" that the user can get cashback of Rs.200 if a credit card of "PQR Bank" is used for paying bills. Therefore, the information processing system may provide a display card having a composite view which captures the details of the offer along with a tab titled "Pay bills" as shown in FIG. 2A. When the user clicks the tab "Pay bills", the information processing system may show the Internet bill or any other bill of the user to which the offer is applicable.

Therefore, the information processing system determines a relationship possibility factor between one text input and other classified text inputs, based on the categories to which the text input and the other classified text inputs belong, and based on information included in the text input and the other classified text inputs. When the relationship possibility factor is positive, i.e. when it is possible to establish a relationship between the text inputs and the other classified text inputs, the information processing system may generate a structured relational information for the user by associating the one or more entities extracted from the text input, with other classified text inputs. Finally, the information processing system may provide the structured relational information to the user in a relational sequence based on a predefined relational criteria. In an embodiment, the relational sequence and predefined relational criteria ensure that, the structured relational information is provided to the user at the appropriate time which in turn provides high probability of using the content recommended for the user via the structured relational information.

Additionally, the information processing system may update the structured relational information, in real-time, when one or more updates related to the information present in at least one of the text input and the other classified text inputs, are received. Such updates ensure that the user is provided with the most recent and updated information or offers.

A description of an embodiment with several components in communication with each other does not imply that all such components are required. On the contrary, a variety of optional components are described to illustrate the wide variety of possible embodiments of the disclosure.

Figure 2B:
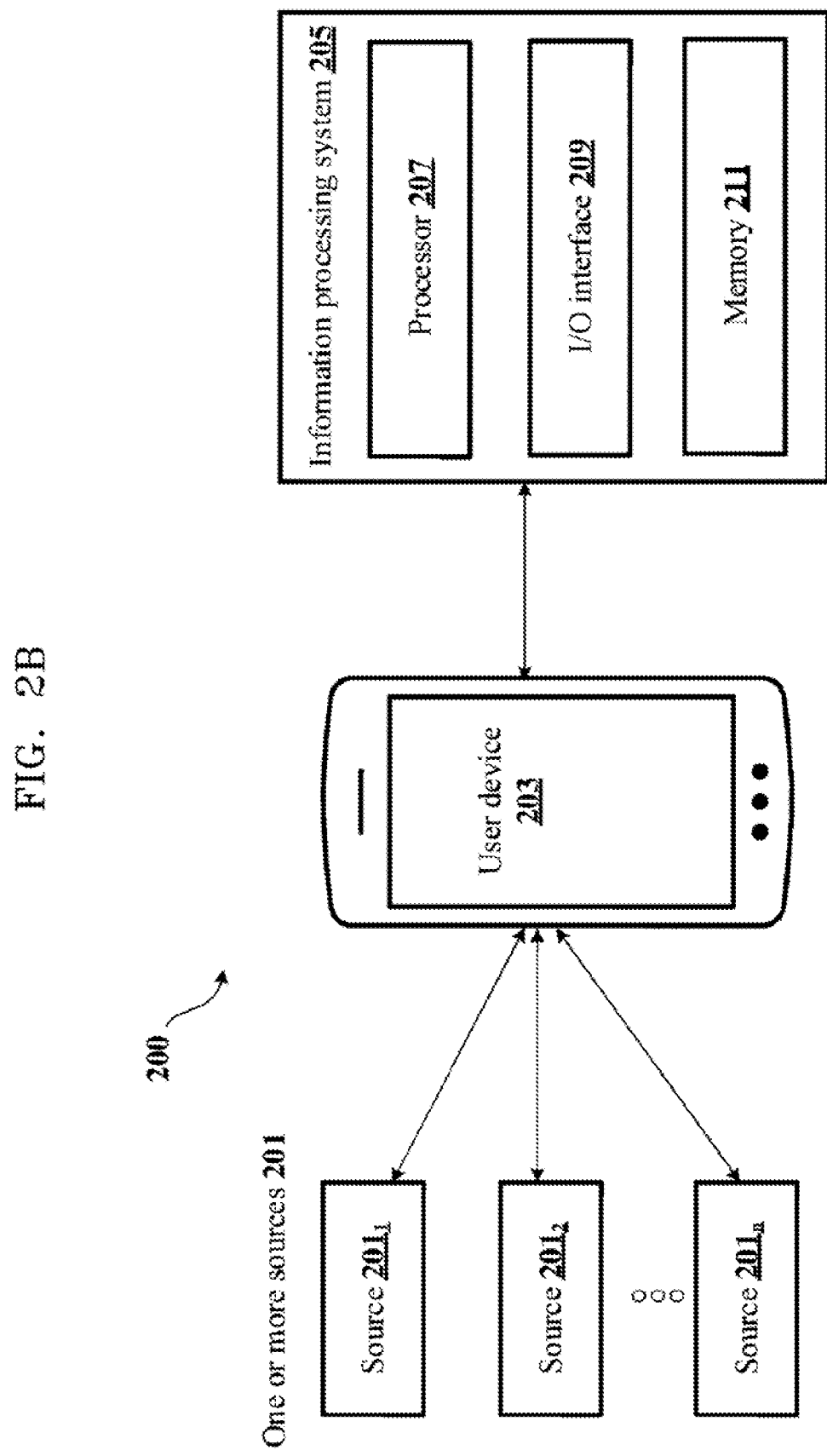
FIG. 2B illustrates an exemplary block diagram for generating relation information from unstructured text according to an embodiment of the disclosure.

FIG. 2B illustrates an exemplary block diagram of a system for generating relation information from unstructured text according to an embodiment of the disclosure.

The system 200 for generating relation information includes source $201_1$ to source $201_n$ (also referred as one or more sources 201), a user device 203 and an information processing system 205. As an example, the one or more sources 201 may include, but are not limited to, application servers that provide alerts for various application used by a user, service providers, shopping website servers, bank servers and the like. In an embodiment, the one or more sources 201 may be voice assistants or voice operated devices such as Alexa™, Bixby® and the like. As an example, the user device 203 may include, but not limited to, a mobile, a tablet, a laptop and a desktop. In an embodiment, the user device 203 may be used by a user to install and operate one or more applications such as banking applications, shopping applications, food delivery applications, ticket booking applications, gaming applications, chatting applications, booking applications and the like. The user device 203 may be associated with servers of each of the one or more applications via a communication network. The communication network may be a wireless communication network. In an embodiment, the user device 203 may receive communication such as messages, emails, notifications, offers, advertisements, and the like, from the servers of the one or more applications. In an embodiment, the communication may include information related to the corresponding one or more applications. The information thus received by the user device 203 are retrievable from the corresponding application installed in the user device 203. In an embodiment, the communication received by the user device 203 may act as a text input for the information processing system 205. In an embodiment, the information processing system 205 may be configured in the user device 203. In an embodiment, the information processing system 205 may include a processor 207, an Input/Output (I/O) interface 209 and a memory 211. The I/O interface 209 may facilitate in receiving or retrieving text input from at least one application installed in the user device 203. As an example, the text input may include, but not limited to, information present in at least one of a text message, an email, a notification, notes stored by user, a Rich Content Service (RCS) message and the like. In an embodiment, the text input may include information in an unstructured text format.

FIG. 2C illustrates an exemplary text input according to an embodiment of the disclosure.

An exemplary text input including information in an unstructured text format is shown referring to FIG. 2C. The exemplary text input is derived from a message received by the user, regarding a ticket booked by the user. Upon receiving the text input, the processor 207 may classify the text input into one or more categories. As an example, the one or more categories may include, but not limited to, a reminder of a schedule to the user, an offer category wherein the offer is associated with service or products, a transaction category related to the transaction between the user and a message sender, a greeting category related to a mere greeting from the message sender, a request category where the request is provided by a sender of a message, or a simple acknowledgement category. Further, the processor 207 may extract one or more entities from the text input based on the one or more categories. In an embodiment, the one or more entities extracted from the text input may be components that indicate context of the text input. Likewise, one or more entities may be extracted from at least one of other text inputs.

FIG. 2D illustrates exemplary entities from the text input according to an embodiment of the disclosure.

As an example, an exemplary text input is shown referring to FIG. 2D. Referring to FIG. 2D, the encircled components such as "Shopping", "Buy 2 Get 4 Free" and "Validity date" may be one or more exemplary entities extracted from the exemplary text input.

Upon extracting the one or more entities, the processor 207 may determine a relationship possibility factor between the text input and at least one of other classified text inputs stored in the information processing system or a remote server. In an embodiment, each of the other classified text inputs may be text inputs that are different from the text input currently received by the information processing system 205. As an example, the other text inputs that are retrieved from the same application or a different application are categorized into one or more categories.

In an embodiment, the relationship possibility factor may be determined based on the corresponding categories associated with the text input and the other classified text inputs, the information present in the text input and information present in the other classified text inputs. The relationship possibility factor may have one of positive or negative value (+/−1). In an embodiment, when the relationship possibility factor is positive, the processor 207 may infer that there is a relation between the text input and the other classified text inputs. In an embodiment, when the relationship possibility factor is negative, the processor 207 may infer that there is no relations between the text input and the other classified text inputs.

When the relationship possibility factor is determined to be positive, the processor 207 may generate structured relational information for the user associated with the information processing system, by associating the one or more entities extracted from the text input and other classified text inputs. In an embodiment, the structured relational information may include a composite view of the information present in the text input and the information present in at least one of other classified text inputs, in a predefined intuitive display format. The processor 207 may provide the structured relation information to the user device 203 so that the structured relation information is displayed on the user device 203, or may control a display of the information processing system 205 to display the structured relation information on the display of the information processing system 205.

Figure 2E:
FIG. 2E illustrates exemplary structured relational information according to an embodiment of the disclosure.

FIG. 2E illustrates exemplary structured relational information according to an embodiment of the disclosure.

Referring to FIG. 2E, exemplary structured relation information that is displayed in the predefined intuitive display format is shown. The processor 207 may provide the structured relational information to the user in a relational sequence, based on a predefined relation criteria.

In an embodiment, the predefined relation criteria may include at least one a time, a location of a user of the electronic device, an event extracted from the text input, or an amount extracted from the text input. For example, if a user makes a note of "sell company A's stock if its stock value below $215," the amount of $215 extracted from the text input may trigger the structured relational information which shows the stock value of company A with a stock transaction application.

In an embodiment, generating the structured relational information and providing the structured relational information to the user in the relational sequence, may be based on a user profile and/or contextual parameters. For example, the user profile may include a location of the user, user preferences, application usage statistics, name of the user, and/or schedule of the user and the contextual parameters may include, but not limited to, demography, location of the user, locations mentioned in the text input and other classified text inputs, date and time, a schedule included in the text input and/or other classified text inputs, application usage statistics, events of services or products, name of a person, user preferences, validity mentioned in the text input and other classified text inputs, predefined statements such as 'sale,' 'appointment,' 'celebration,' 'invitation,' and etc. included in the text input and/or other classified text inputs and cost or price mentioned in the text input and/or other classified text inputs. In an embodiment, the processor 207 may update, in real-time, the structured relational information, upon receiving one or more updates related to the information present in at least one of the text input and at least one of the other classified text inputs which contribute to generation of the structured relational information.

Figure 3A:
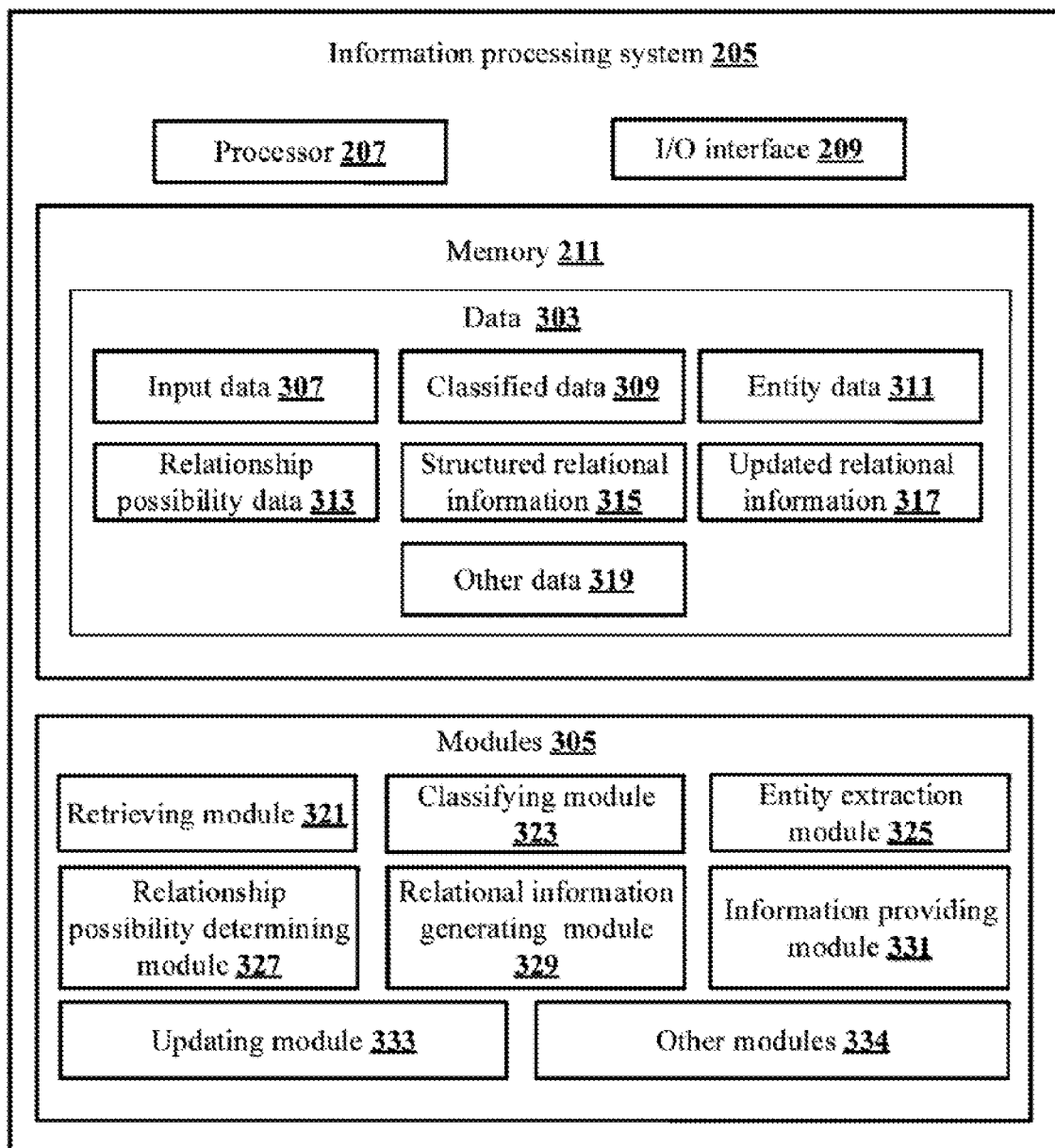
FIG. 3A illustrates a block diagram of an information processing system for generating structured relational information from unstructured text according to an embodiment of the disclosure.

FIG. 3A illustrates a block diagram of an information processing system for generating structured relational information from unstructured text according to an embodiment of the disclosure.

In some implementations, the information processing system 205 may include data 303 and a plurality of software or hardware modules 305. As an example, the data 303 is stored in the memory 211 configured in the information processing system 205 as shown in the FIG. 3A. In an embodiment, the data 303 may include input data 307, classified data 309, entity data 311, relationship possibility data 313 corresponding to the relationship possibility factor, structured relational information 315, updated relational information 317 and other data 319.

In an embodiment, the data 303 may be stored in the memory 211 in form of various data structures. Additionally, the data 303 may be organized using data models, such as relational or hierarchical data models. The other data 319 may store data, including temporary data and temporary files, generated by the modules 305 for performing the various functions of the information processing system 205.

In an embodiment, the data 303 stored in the memory 211 may be processed by the modules 305 of the information processing system 205. The modules 305 may be stored within the memory 211. In an example, the modules 305 communicatively coupled to the processor 207 configured in the information processing system 205, may also be present outside the memory 211 as shown in FIG. 3A and implemented as hardware. As used herein, the term modules refer to an application specific integrated circuit (ASIC), an electronic circuit, a processor (e.g., a shared processor, a dedicated processor, or a group of plurality of processors) and memory that execute one or more software or firmware programs, a combinational logic circuit, and/or other suitable components that provide the described functionality.

In an embodiment, the modules 305 may include, for example, a retrieving module 321, a classifying module 323, an entity extraction module 325, relationship possibility determining module 327, a relational information generating module 329, an information providing module 331, an updating module 333 and other modules 334. The other modules 334 may be used to perform various miscellaneous functionalities of the information processing system 205. It will be appreciated that the aforementioned modules 305 may be represented as a single module or a combination of different modules. It will be also appreciated that the aforementioned modules 305 may be processed or accessed by the processor 207 to perform a corresponding action. Therefore, the action performed by the modules 305 may be technically performed by the processor 207.

In an embodiment, the retrieving module 321 may retrieve text inputs from at least one application installed in a user device 203. As an example, the text input may include, but not limited to, information present in at least one of a text message, chatting made on a chat application, an email, a notification, a memo, texts generated by a word-processor application, an alarm, notes stored by the user, a Rich Content Service (RCS) message and the like. In an embodiment, the text input may include information in an unstructured text format. The text input thus retrieved may be stored as input data 307.

In an embodiment, the classifying module 323 may classify the text input into one or more categories. As an example, the one or more categories may include, but not limited to, reminder category, offer category, transaction category and other categories. Table 1 shows exemplary categories and their respective sub-categories.

TABLE 1

| REMINDER CATEGORY | OFFER CATEGORY | TRANSACTION CATEGORY | OTHER CATEGORIES |
|---|---|---|---|
| Reminder_bill | Offer_flight | Transaction_bill | Information |
| Reminder_flight | Offer_cab | Transaction_shopping | One Time Password (OTP) |
| Reminder_train | Offer_food | Transaction_food | |
| Reminder_cab | Offer_hotel | Transaction_travel | |
| Reminder_delivery | Offer_movie | | |
| Reminder_appointment | Offer_shopping | | |
| Reminder_bus | | | |
| Reminder_movie | | | |
| Reminder_event | | | |

In an embodiment, the text input may be classified into the one or more categories using one or more hierarchical Convolutional Neural Network (CNN) techniques.

Figure 3B:
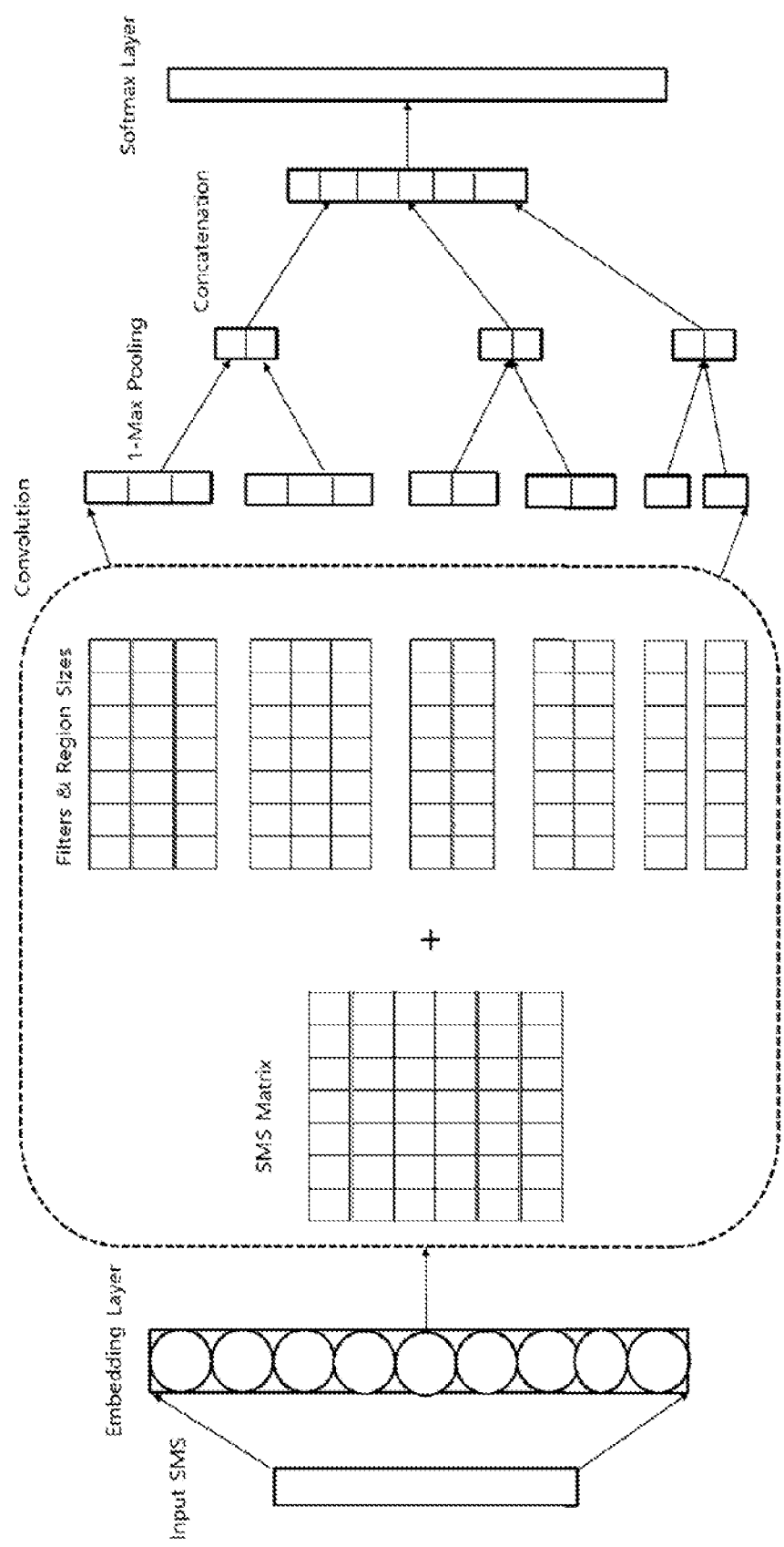
FIG. 3B illustrates an exemplary hierarchical Convolutional Neural Network (CNN) according to an embodiment of the disclosure.

FIG. 3B illustrates an exemplary hierarchical Convolutional Neural Network (CNN) according to an embodiment of the disclosure.

Based on the hierarchical CNN as shown in the FIG. 3B, the classifying module 323 may convert the received text input into a template dynamically. As an example, the text input is received as shown below:

BUY 1 GET 4 FREE Clearance Sale is live|9th-10th July 10% Instant Discount on ABCD bank cards! http://sms-d.in/7MvGnE79

The classifying module 323 may convert the above text input into a corresponding template dynamically as shown below:

BUY•<num>•GET•<num>•FREE•Clearance•Sale•is•live•|•<date>•<num>%•Instant•Discount•on•ABCD•bank•cards!•<url>¶

Using the text input and the template of the text input, the classifying module 323 may perform random subsampling to generate one or more subsets of the text input. Simultaneously, the classifying module 323 may generate custom embeddings and thereafter perform vector quantization to generate quantized embeddings. The classifying module 323 may further provide a result of random subsampling and a result of vector quantization to an embedding layer, which then classifies the text input into the one or more categories. The text input thus classified may be stored in the memory 211 as classified data 309.

Further, In an embodiment, upon classifying the text input into one or more categories, the entity extraction module 325 may extract one or more entities from the text input, based on the one or more classified categories. In an embodiment, the one or more entities extracted from the text input may be components that indicate or represent a context of the text input, as encircled in FIG. 2D. In an embodiment, the entity extraction module 325 may extract the one or more entities by parsing the classified text input. In an embodiment, the entity extraction module 325 may be configured with entity parsers for parsing the classified text input and identifying different types of entities from the text input.

In an embodiment, the a relationship possibility factor may be determined by detecting a keyword from the received text input and another keyword from the at least one of or each of other classified text inputs, an association between the keyword and another keyword may be determined to determine whether the relationship possibility factor is positive or negative. If the association between the first keyword and the second keyword is detected, the relationship possibility factor becomes positive.

Table 2 shows exemplary entity parsers and their corresponding functionalities as shown below.

TABLE 2

| Entity Parsers | Functionality |
|---|---|
| AppointmentId_Parser | Extracts the appointment ID from reminder appointment message |
| AppointmentName_Parser | Extracts the appointment name from reminder appointment message |
| BookingId_Parser | Extracts booking ID from reminder movie message |
| ContactNum_Parser | Extracts the contact number from |

TABLE 2-continued

| Entity Parsers | Functionality |
|---|---|
| | reminder message |
| Coupon_Parser | Extracts the coupon code from an offer message |
| CreditCardDue_Parser | Extracts due date for the reminder bill. |
| DeliveryItem_Parser | Extracts Product details for the reminder delivery |
| EntityNameNumber_Parser | Extracts value of Train/Flight/Bus name from the travel related message |
| EntityStatus_Parser | Extracts status suggesting whether Train/Flight/Bus is delayed or cancelled |
| HospitalName_Parser | Extracts hospital name for the reminder appointment. |
| MovieName_Parser | Extracts movie name from the reminder movies message |
| MovieScreen_Parser | Extracts screen number of the movie for reminder movie messages |
| ServiceType_Parser | What kind of service (Doctor, Electrician, Plumbing) for reminder appointment |
| Date_Parser | Extracts date from the offer messages, reminder messages, travel related messages etc. |

TABLE 2-continued

| Entity Parsers | Functionality |
| --- | --- |
| Seat_Parser | Extracts seat numbers for Train, Bus, Event messages |
| TheatreName_Parser | Extracts theatre name where movie is being shown |
| TicketCity_Parser | Extracts city name where movie is being shown |
| Time_Parser | Extracts time from the message for reminder, offer, OTP messages |
| TravelerName_Parser | Extracts traveller name for the Flight, Train & Bus |
| MovieScreen_Parser | Extracts screen ID of the cinema from the reminder movie |
| OfferDetails_Parser | Extracts offer string details from the offer message |
| OTP_Parser | Extracts One Time Password (OTP) extraction from the Verification/OTP code message |
| PNR_Parser | Extracts Passenger Name Record (PNR) of the Flight, Train & Bus from reminder message. |
| BusBoardingPoint_Parser | Extracts boarding address of bus from reminder bus messages |
| BusName_Parser | Extracts name of the bus from the reminder bus messages |

Figure 3C:
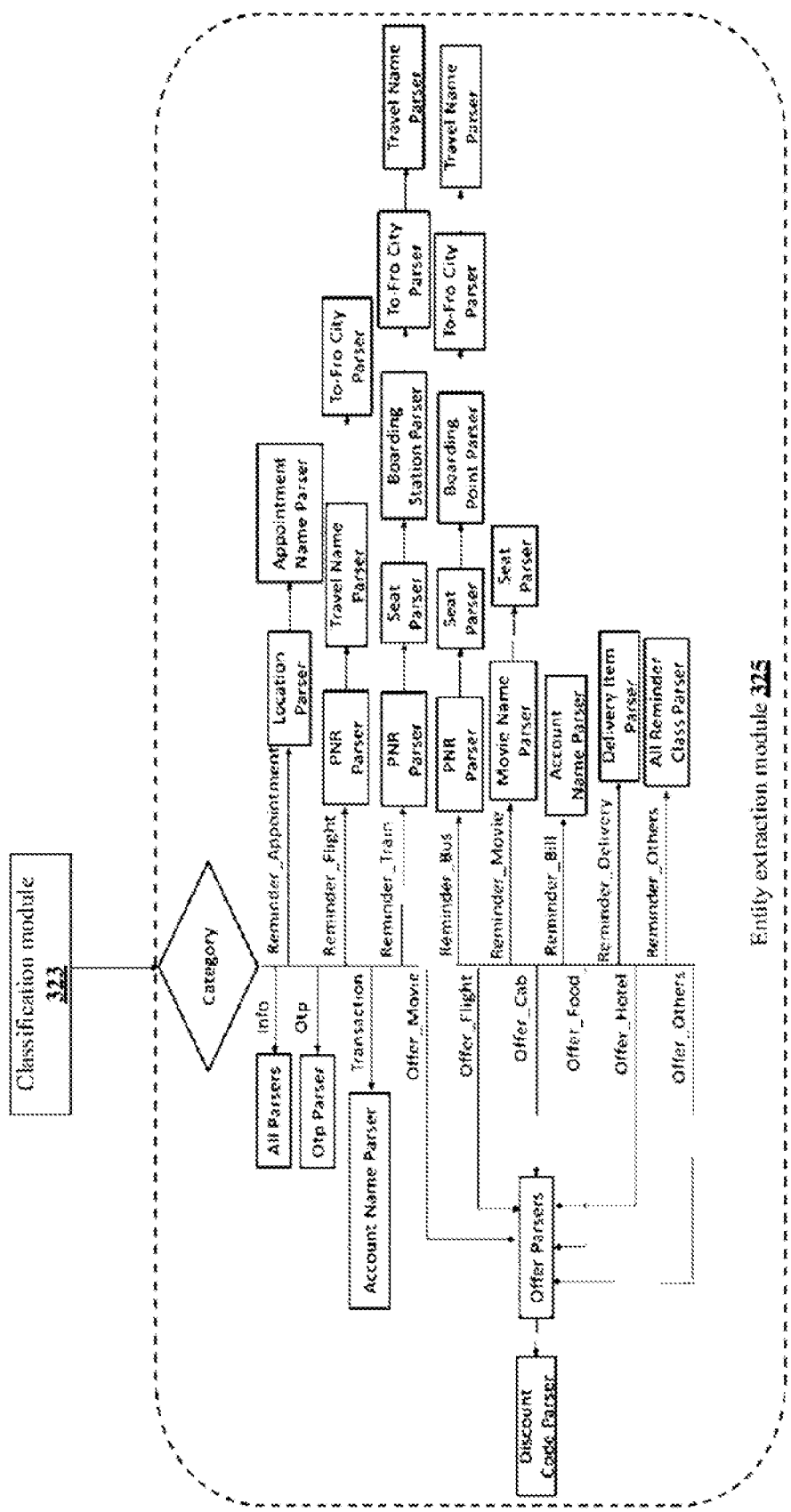
FIG. 3C illustrates exemplary entity parsers used for exemplary categories of text input according to an embodiment of the disclosure.

FIG. 3C illustrates exemplary entity parsers used for exemplary categories of text input according to an embodiment of the disclosure In an embodiment, the entity extraction module 325 may use the entity parsers for extracting the one or more entities, based on the one or more categories into which the text input is classified as shown in FIG. 3C. When the category is "Reminder" and the sub-category is "Reminder Appointment", the entity extraction module 325 may use entity parsers such as "Location Parser" and "Appointment Name Parser" to extract entities such as "Location of the appointment" and "Name/type of appointment". Similarly, when the category is "Offer" and the sub-category is "Offer Cab", the entity extraction module 325 may use entity parsers such as "Offer Parser", "Discount Code Parser", "Date Parser" to extract entities such as "offer information", "discount provided by the offer" and "Validity of the offer". However, when the category is "other categories" and sub-category is "Information", all the entity parsers may be used for extracting one or more entities, as "information" may include different kind of entities. The one or more entities thus extracted by the entity extraction module 325 may be stored as the entity data 311.

In an embodiment, the entity extracted from or included in the text input may include appointment information included in the text input associated with an appoint reminder, booking information included in the text input associated with a booking application, time information included in the text input, location information included in the text input, contact information included in the text input, coupon information included in the text input, payment information included in the text input, delivery information included in the text input, transportation information included in the text input, product provider information included in the text input, product information included in the text input, service provider information included in the text input, and/or service information included in the text input.

Further, in an embodiment, the relationship possibility determining module 327 may determine a relationship possibility factor (also known as a relation factor) between the text input and at least one of or each of other classified text inputs stored in the information processing system 205 or a server. As an example, when "Message D" is considered as the text input and classified currently, then "Message A", "Message B" and "Message C" which have been classified and stored earlier, would be considered as other classified text inputs.

In an embodiment, an application associated with the other classified text inputs may be different from an application associated with the received text input. That is, "Message D" is accessed or displayed with an application D and "Message A", "Message B" and "Message C" may be accessed or displayed with an application A, B, and C, respectively. In an embodiment, all of the messages "Message A", "Message B", "Message C" and "Message D" may be accessed or displayed with the same application.

In an embodiment, the relationship possibility determining module 327 may determine the relationship possibility factor based on the corresponding categories associated with the text input and the other classified text inputs, the information present in the text input, and information present in the other classified text inputs. In an embodiment, the relationship possibility determining module 327 may determine the relationship possibility factor using one or more machine learning techniques as described below.

For instance, the relationship possibility determining module 327 may determine whether the one or more categories associated with the text input and categories associated with each of the other classified text inputs, are related. In an embodiment, the relationship possibility determining module 327 may determine whether the one or more categories of the text input and the other classified text inputs are related based on a predefined relationship association table stored in the memory 211. The predefined relationship association table may be generated using the one or more machine learning techniques, which perform statistical analysis of user usage over a period of time. More particularly, the associations between categories are generated based on at least one of the association between the first keyword and the second keyword or statistical analysis of a user's usage of applications in the electronic device over a predetermined period of time. Table 3 shows an exemplary predefined relationship association table, with exemplary relationship associations.

TABLE 3

| Major Categories Association | Subcategory 1 | Subcategory 2 |
| --- | --- | --- |
| Reminder to Offer | Reminder_flight | Offer_cab<br>Offer_Shopping<br>Offer_hotel<br>Offer_food<br>Offer_flight |
| Offer to Reminder | Offer_bill | Reminder_bill |
| OTP to Transaction | OTP | Transaction_bill<br>Transaction_shopping<br>Transaction_food<br>Transaction_travel |

According to Table 3, the category such as "Reminder" may be related to category of "Offer", the category of "Offer" may be related to the category of "Reminder" and the category of "OTP" may be related to the category of "Transaction".

Further, the relationship possibility determining module 327 may determine one or more keywords from the text input and at least one of or each of the other classified text inputs, whose associated categories are determined to be related. In an embodiment, the keywords may be determined based on not just the exact words present in the text input and other classified text inputs, but synonyms of the words and a word vector generated from word embeddings(also known as vector embeddings) generated from the text input and/or the other classified text inputs. Therefore, the relationship possibility determining module 327 may first determine the synonyms of words used in the text input and other classified text inputs, and generate vector embeddings to perform similarity check between the words. Based on the determined synonyms and generated vector embeddings, the relationship possibility determining module 327 may then determine if the keywords from the information present in the text input and the information present in each of the other classified text inputs are related or not.

As an example, consider Message 1 as shown below, which belongs to the category "Reminder" and sub-category "Reminder_bill":

"Bill of Rs 731, dated 3 Oct. 2019 for XYZ No. 9XXXX665 is due on 21 Oct. 2019. Pay ontime to avoid late fee. To pay via app using cards/netbanking/Airtel payments bank, click http://www.xyz.in/5/coll or visit an XYZ Store. Ignore if paid."

As an example, consider Message 2 as shown below, which belongs to the category "Offer" and sub-category "Offer_bill":

"Flat Rs.75 cashback on min Recharge/Bill of Rs.75. Use code PULL75 for sukumar.moharana@bmail.com till 7 February frch.in/XM"

As per the above Table 3, category "Reminder" may be related to category "offer". Since, these two categories are determined to be related, the relationship possibility determining module 327 may determine one or more keywords from the information present in Message 1 and Message 2, as shown below:

Message 1: Keywords: XYZ, Phone (Phone is derived from the details "XYZ No. 9XXXX665")
Message 2: Keywords: Cashback, Recharge, Phone, DTH (Phone and DTH are derived as they are related to recharge)

Upon determining the keywords, the relationship possibility determining module 327 may compare the one or more keywords from the information present in the text input and the information present in each of the other classified text inputs, to determine a match.

In the above example, upon comparing the keywords of both Message 1 and Message 2, both the messages have a common or matched keyword, which is "Phone".

When the match is determined, the relationship possibility determining module 327 may determine the relationship possibility factor between the text input and each of the other classified text inputs to be positive, otherwise negative. In an embodiment, the relationship possibility factor may be one of positive or negative. When the relationship possibility factor is determined to be positive, it means that, relationship between the text input and the other classified text inputs is possible. In an embodiment, when the relationship possibility factor is negative, the processor 207 may infer that relationship between the text input and the other classified text inputs is not possible.

As an example, consider Message 1 as shown below, which belongs to the category "Reminder" and sub-category "Reminder_bill":

"Bill of Rs 731, dated 3 Oct. 2019 for XYZ No. 9XXXX665 is due on 21 Oct. 2019. Pay ontime to avoid late fee. To pay via app using cards/netbanking/Airtel payments bank, click http://www.xyz.in/5/coll or visit an XYZ Store. Ignore if paid."

As an example, consider Message 3 as shown below, which belongs to the category "Offer" and sub-category "Offer_Bill":

"20 Cashback on Landline and Broadband bill payments Valid on Landline and Broad band bill payments (On Min. Payment of 500. Max. once per user. Only for UPI Payments)"

Based on Table 3, yes, categories of Message 1 and Message 3 are considered to be related, and hence keywords are determined from Message 1 and Message 3, to determine if there is a match of keywords.

As an example, one or more keywords from the information present in Message 1 and Message 3, as shown below:

Message 1: Keywords: XYZ, Phone (Phone is derived from the details "XYZ No. 9XXXX665")
Message 3: Keywords: Landline, Broadband, Internet, (Internet is derived from Broadband)

Though, the categories of Message 1 and Message 3 are considered to be related, the one or more keywords from the information present in Message 1 and Message 3 do not match. Therefore, the relationship possibility determining module 327 may determine the relationship possibility factor between Message 1 and Message 3 to be negative.

The relationship possibility factor thus determined may be stored as the relationship possibility data 313.

Further, In an embodiment, when the relationship possibility factor is positive, the relational information generating module 329 may generate structured relational information 315 for the user associated with the information processing system 205, by associating the one or more entities extracted from the text input and other classified text inputs. In an embodiment, the structured relational information 315 may be generated in accordance with a relational sequence, based on a predefined relation criteria. As an example, the relational sequence may be defined as the sequence in which different categories/sub-categories of the text input and other classified text inputs may be associated, based on user profile and contextual parameters. As an example, the contextual parameters may include, but not limited to, demography, location of the user, locations mentioned in the text input and other classified text inputs, date and time, usage statistics, user preferences, validity mentioned in the text input and other classified text inputs, and cost factor mentioned in the text input and other classified text inputs such as offer amount, discount amount etc. In simple terms, the structured relational information 315 may generate the structured relational information 315 by comparing 1) a category of the text input with the category of the other classified text inputs, 2) a category of the text input with information of the other classified text inputs, and 3) an information of the of the text input with the information of the other classified text inputs.

In an embodiment, the information providing module 331 may provide such structured relational information 315 to the user in the relational sequence, based on the predefined relation criteria. Which means that, the relational information generating module 329 may have generated the structured relational information 315 for the user, but such structured relational information 315 is provided to the user in the relational sequence one after the other, based on the predefined relation criteria. In an embodiment, the predefined relation criteria may be time-based criteria, which helps in providing appropriate structured relational information 315 to the user at the appropriate time. An exemplary predefined relation criteria for different categories and subcategories are as shown in Table 4 below.

TABLE 4

| Major Categories Association | Subcategory 1 | Subcategory 2 | Predefined relation criteria |
|---|---|---|---|
| Reminder to Offer | Reminder_flight | Offer_Cab | Before 24 hrs of travel |
| | | Offer_Shopping | 48 hrs-24 hrs of travel |
| | | Offer_hotel | Before 24 hrs of travel After travel |
| | | Offer_food | Before 24 hrs of travel During travel After travel |
| | | Offer_flight | After travel |
| Offer to Reminder | Offer_bill | Reminder_bill | Offer validity lies in the billing cycle |
| OTP to Transaction | OTP | Transaction_bill Transaction_shopping Transaction_food Transaction_travel | Transactional session time |

As shown in the above Table 4, when Reminder flight and Offer_cab are determined to have a positive relationship possibility factor, the relational information generating module 329 may generate and provide structured relational information 315 for the user, in the relational sequence, based on the predefined relation criteria. According to Table 4, the predefined relation criteria associated with Reminder flight and Offer cab is "Before 24 hrs of travel", which means that, the structured relational information 315 comprising the Reminder flight and Offer_cab is provided to the user, 24 hrs before his travel. Similarly, According to Table 4, the predefined relation criteria associated with Reminder flight and Offer_shopping is "48-24 hrs of travel", which means that, the structured relational information 315 comprising the Reminder flight and Offer_shopping is provided to the user, 48-24 hrs before his travel. Therefore, the present disclosure is not only generating and providing the structured relational information 315 for the user which is insightful, but also ensures that the structured relational information 315 is provided to the user at the appropriate time based on the relational sequence and the predefined relation criteria. In an embodiment, the relational sequence and the predefined relation criteria are related.

In an embodiment, the information providing module 331 may provide the structured relational information 315 to the user in a predefined intuitive display format. The structured relational information 315 may include a composite view of the information present in the text input and the information present in at least one other classified text input, in a predefined intuitive display format as shown in FIG. 2E.

Figure 3D:
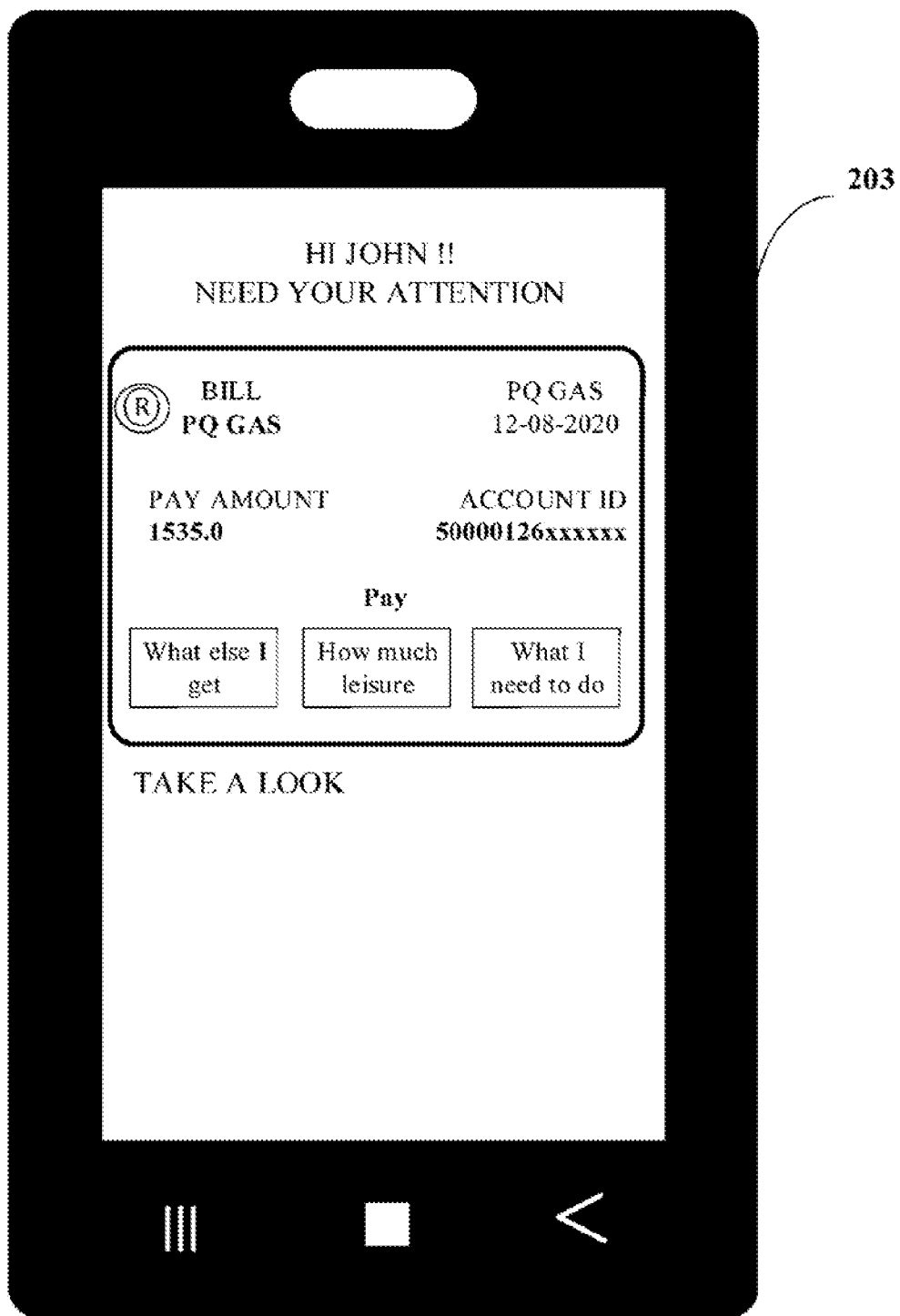
FIG. 3D and FIG. 3E illustrate exemplary intuitive displays of the structured relation information according to an embodiment of the disclosure.
Figure 3E:
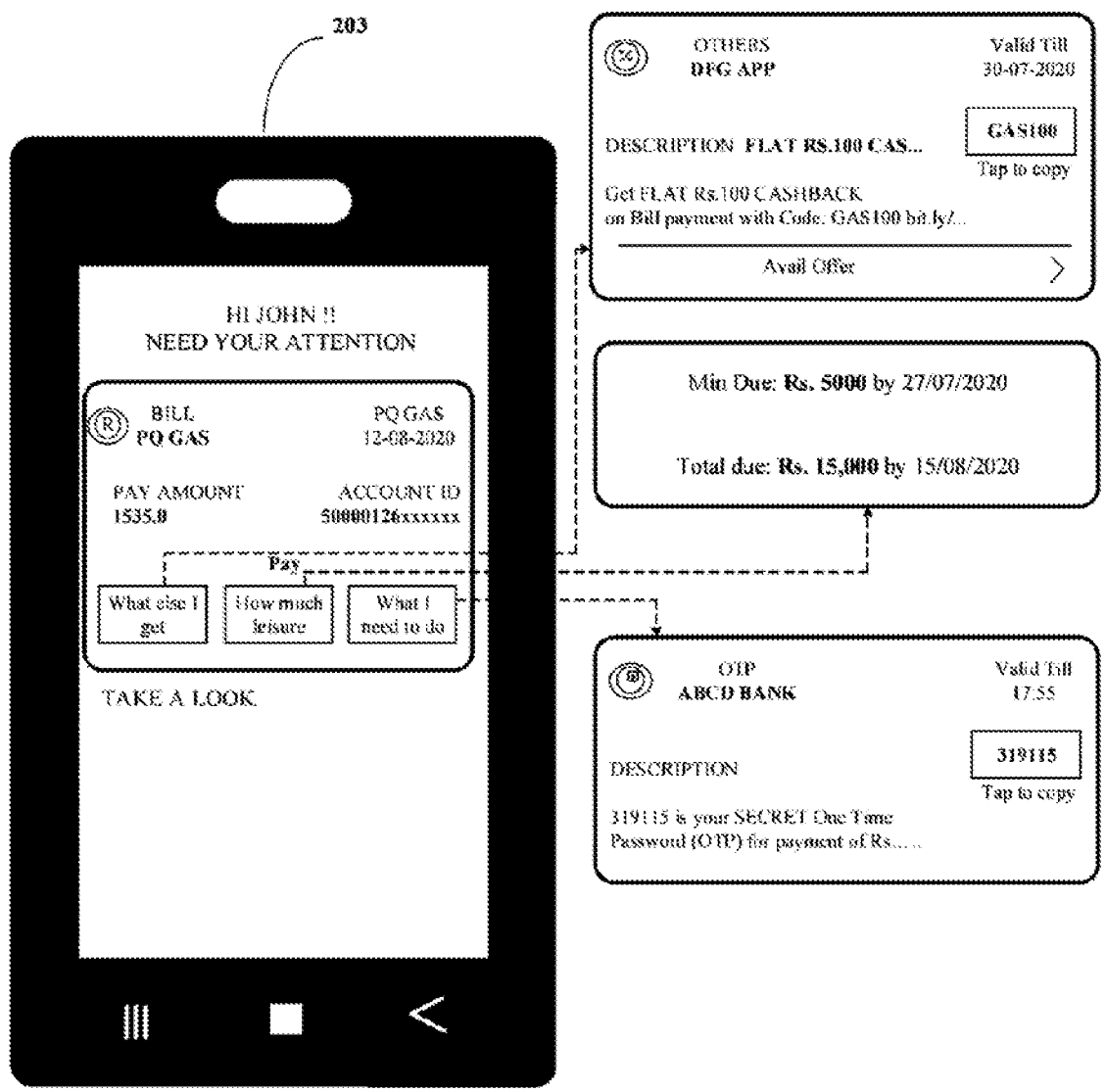

FIG. 3D and FIG. 3E illustrate exemplary intuitive displays of the structured relation information according to an embodiment of the disclosure.

In an embodiment, the intuitive display may be as shown referring to FIG. 3D. In FIG. 3D, the information providing module 331 provides an alert indicating "Hey John!! Need your attention". The alert provides a reminder to the user to pay gas bill of Rs.1535. Along with the reminder, the information providing module 331 may provide three clickable icons titled as, for instance, "What else I get", "How much leisure" and "What I need to do". When the user clicks on icon 1 "What else I get", the information providing module 331 may provide an offer card which may be applicable while making the payment for the gas bill as shown in FIG. 3E. When the user clicks on icon 2 "How much leisure", the information providing module 331 may provide deadline and the due amount as shown in FIG. 3E. When the user clicks on icon 3 "What I need to do", the information providing module 331 may provide information related to OTP or password to make the payment as shown in FIG. 3E.

FIG. 3F1 and FIG. 3F2 illustrate exemplary unstructured text inputs received according to an embodiment of the disclosure.

Figure 3G:
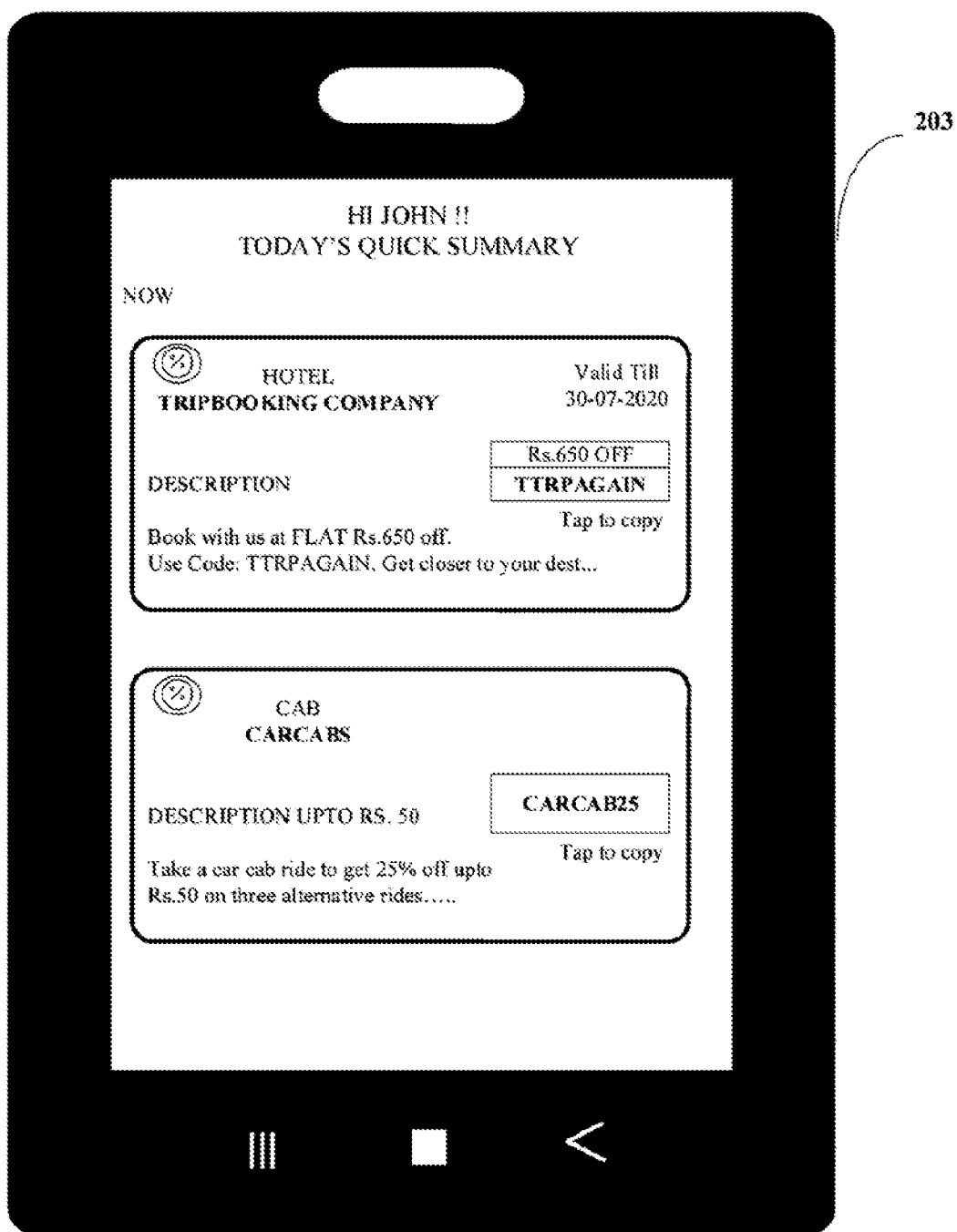
FIG. 3G illustrates consolidated view of exemplary display cards according to an embodiment of the disclosure.

FIG. 3G illustrates consolidated view of exemplary display cards according to an embodiment of the disclosure.

In another embodiment, the intuitive display may be shown referring to FIG. 3G. FIG. 3G provides a quick summary of the different categories of text inputs received in a day. For instance, consider the user device 203 received two messages in an unstructured format as shown in the FIG. 3F1 and FIG. 3F2. These two messages may be converted into a structured format i.e. into a display card and provided to the user as shown in the FIG. 3G, to provide a consolidated view.

In an embodiment, the structured relational information may be displayed based on a time sequence related to the text input or the at least one of other classified text inputs. For example, the structured relational information may be displayed in a chronological order.

Further, in an embodiment, the updating module 333 may update the structured relational information, in real-time, when the information processing system 205 receives one or more updates related to the information present in at least one of the text input and the other classified text inputs, which contribute to generation of the structured relational information 315.

FIG. 3H1 illustrates an exemplary method of generating structured relation information according to an embodiment of the disclosure.

In an example, FIG. 3H1 shows an exemplary method of generating structured relational information 315 based on a text input A and text input B. The text input A and the text input B may be classified based on the method explained above. Thereafter, a relational matching is performed by comparing the category of the text input A with the category of text input B, the category of the text input A with information of text input B, and information of the text input A with information of text input B. As shown in FIG. 3H1, comparing category of the text input A with category of text input B may be for example, comparing reminder travel with offer travel. As shown in FIG. 3H1, comparing category of the text input A with information of text input B may be for example, comparing reminder travel with offer code. As shown in FIG. 3H1, comparing information of the text input A with information of text input B may be for example, comparing travel date with offer valid date. Consider, the information processing system 205 received another text input C, which indicates cancellation of a ticket.

FIG. 3H2 illustrates an exemplary method of updating structured relation information according to an embodiment of the disclosure.

The updating module 333 may compare one or more entities such as unique identifiers of the text input C with one or more entities i.e. unique identifiers of the classified text inputs already stored in the memory 211. Based on the comparison, the updating module 333 may be able to determine if the text input C is an update of an existing text input or if it is a new text input. As an example, if the PNR number or flight number or travel date of text input A matches with PNR number or flight number or travel date in text input C, respectively, then the information processing system 205 may infer that, the text input C is an update of the text input A. In this scenario, the text input C as shown in FIG. 3H2 is determined to be an update of the text input A. Based on such determination, the updating module 333 may gather the structured relational information 315 which was generated for the text input A, and updates the structured relational information 315, to generate updated relational information 317 that indicates cancellation of the flight ticket seen in text input A. The updated relational information 317 may be as shown in FIG. 3H2.

Henceforth, the process of generating relational information from unstructured text is explained with the help of one or more examples for better understanding of the disclosure. However, the one or more examples should not be considered as limiting the scope of the disclosure.

FIG. 3I1, FIG. 3I2 and FIG. 3I3 illustrate exemplary scenarios of generating relation information from unstructured text according to an embodiment of the disclosure.

Consider exemplary text inputs 335, 337, 339 and 341 as shown in FIG. 3I1 which are received in an unstructured format and present in a cluttered message inbox in a user device 203 of the user.

FIG. 3J1 illustrates an exemplary storage format of unstructured text according to an embodiment of the disclosure and FIG. 3J2 illustrates an exemplary storage format of classified text input according to an embodiment of the disclosure.

The text inputs 335, 337, 339 and 341 received in the unstructured format may be stored in the backend as shown in FIG. 3J1. The format shown in FIG. 3J1 is only exemplary and may include additional components/elements, or lesser components/elements. Thereafter, the processor 207 may classify the text inputs 335, 337, 339 and 341 into one or more categories and extract one or more entities from each of the classified text inputs 335, 337, 339 and 341. The classified text inputs 335, 337, 339 and 341 may be stored in the backend as shown in FIG. 3J2. FIG. 3J2 shows storing text inputs with respect to category "Offers" and sub-categories "Offer_others", "Offer_shopping" and "Offer_cab". Similarly, the text inputs may be stored for other categories such as "Reminder" and sub-categories "Reminder_bill", "Reminder_flight" and the like. Also, the format shown in the FIG. 3J2 is only exemplary and may include additional components/elements, or lesser components/elements. In FIG. 3J2, Element "_id" indicates indexing of the offer;

Element "Type" indicates type of the offer;

Element "Msg Id" indicates original message Id which is unique to each text input;

Element "Organization name" indicates name of the message sender;

Element "Valid Date" indicates date upto which the offer is valid;

Element "Offer" indicates brief summary of the offer;

Element "Coupon code" indicates the code provided to avail the offer;

Element "Validity" indicates internal reference time in milliseconds;

Element "Copied" indicates number of times the offer has been used;

Element "Description" indicates actual received message; and

Element "Link" indicates the Universal Resource Locator (URL) to avail the offer.

Further, the processor 207 may generate display cards for each of the classified text inputs 335, 337, 339 and 341, under respective category headings as shown in FIG. 3I1. For instance, classified text input 335 is presented in the form of a display card 343 under the category titled as "Reminder" as shown in the FIG. 3I1. Similarly, classified text input 339 is presented in the form of a display card 347 and classified text input 341 is presented in the form of a display card 345 under the category titled as "Offer", as shown in the FIG. 3I1.

Further, the processor 207 may determine a relationship possibility factor between the classified text inputs 335, 337, 339 and 341. The relationship possibility factor between the classified text input 337 and the classified text input 339 is determined to be positive. Therefore, the processor 207 may generate structured relational information for the user, in the form of a display card having a composite view, by combining the details of the classified text input 337 and the classified text input 339. As an example, the display card 349 under the category titled as "Reminder" is presented in the composite view, which provides a reminder to the user about the flight details and also provides a tab titled as "Book Cab" to select the associated offer present in the classified text input 339, as shown in the FIG. 3I1. When the user clicks on the tab titled as "Book Cab", the processor 207 may provide the display card 347 to the user device 203 so that the display card 347 is displayed on the display screen of the user device 230.

In an embodiment, the display cards may be presented to the user in a relational sequence based on the predefined relation criteria. As an example, consider the predefined relation criteria as shown below:

Before 48 hrs~24 hrs of travel→Offer_shopping

Before 24 hrs of travel→Offer_cab

Based on demography after travel→Offer_food

Based on user profile→Offer_shopping

The above predefined relation criteria means that before 48 hrs-24 hrs of travel, the user may consider shopping for the travel. Therefore, the processor 207 may provide a display card 351 having a composite view which provides a reminder to the user about the flight details and also provides a tab titled as "Go Shopping" to select the associated offer, as shown in FIG. 3I2. Upon clicking the tab titled as "Go Shopping", the processor 207 may display the display card 353 to the user, as shown in the FIG. 3I2. Further, before 24 hrs of travel, the user may consider booking a cab for the travel. Therefore, the processor 207 may provide the display card 349 having a composite view which is already discussed above in detail. Furthermore, after the travel, the user may look for places to dine or places for shopping. Therefore, based on user profile, the processor 207 may provide a display card 355 having a composite view, which provides a shopping offer to the user and also provides a tab titled as "Order Food" to select the associated offer as shown in FIG. 3I3. Upon clicking the tab titled as "Order Food", the processor 207 may display the display card 356 to the user as shown in FIG. 3I3.

FIG. 3K1 illustrates an exemplary scenario of generating relation information from unstructured notes stored in a user device according to an embodiment of the disclosure.

Further, in an embodiment, using the same method as explained above, the processor 207 may relate notes saved by the user in the user device, with the offers in order to provide a suitable display card to the user. For instance, consider the notes saved by the user are "Order cake before leaving office", "Pay ABCD bank's installment without fail", and "Buy groceries" as shown in FIG. 3K1. The processor 207 may determine offers which could be suitable for complying with the notes saved by the user and provides the corresponding display cards to the user. As an example, for the notes "Order cake before leaving office", "Pay ABCD bank's installment without fail", and "Buy groceries", the processor 207 may provide the display cards 357, 359 and 361 respectively, as shown in FIG. 3K1. Similarly, the method may be performed for Rich Content Services (RCS) messages.

Furthermore, in an embodiment, when there is more than one offer suitable for the user, the processor 207 may select the best among the available offers. The best offer among the available offers may be selected based on parameters such as offer amount, user's past preference, user's location, offer validity and the like. As an example, an offer providing the highest cost benefit for the user may be selected as the best offer for the user. In another example, the offer of cab company "ABC" may be selected as the best offer for the user, since user has preferred offers of cab company "ABC" in the past, when compared to offers of other cab companies.

FIG. 3K2 illustrates an exemplary scenario of selecting best offer from multiple offers for the user according to an embodiment of the disclosure.

As an example, consider the display card 349 under the category titled as "Reminder" is presented in the composite view, which provides a reminder to the user about the flight details and also provides tabs titled as "Book Cab" and "Go Shopping" to select the associated offer as shown in FIG. 3K2. Consider there are two offers that are most appropriate for the user to travel via cab to the airport, that are selected based on user's past preference. When the user clicks on the tab titled as "Book Cab", the processor 207 may provide display cards 363 and 365 to the user, as shown in FIG. 3K2, from which the user may select the preferred offer. Similarly, consider there are two offers that are most appropriate for the user to shop before the travel, which are selected based on offer amount i.e. offer that provide highest cost benefit for the user compared to other offers. When the user clicks on the tab titled as "Go shopping", the processor 207 may provide display cards 367 and 369 to the user, as shown in FIG. 3K2, from which the user may select the preferred offer.

FIG. 3K3 illustrates an exemplary scenario of generating relation information in a preferred language of the user according to an embodiment of the disclosure.

Further, in an embodiment, the processor 207 may provide convert the text input into a preferred language of the user and provide the display card in the preferred language. An exemplary display card 371 which is converted into a preferred language of the user, is as shown in FIG. 3K3.

In an embodiment, to generate the structured relational information, the processor 207 may consolidate data from across various applications installed in the user device 203. Based on the consolidated data, the processor 207 may provide the structured relational information to the user based on predefined relation criteria. As an example, consider 24 hrs before travel, the processor 207 is configured to provide the structured relational information in the format of a display card having a composite view, which provides a reminder of the flight details along with offers for booking a cab which could be helpful for commuting to the airport, as per the relational sequence. However, consider there is a note saved by the user in the user device 203, which reads "Order cake before leaving office". Further, consider there is a reminder to pay gas bill. Therefore, along with the display card comprising a reminder for flight details and offers for booking, the processor 207 may also provide display card comprising offers to book a cake and a display card comprising offers such as cashback or discount of usage of certain credit cards, for paying the gas bill. Therefore, the processor 207 may provide three display cards to the user by collating/consolidating data from across multiple applications.

FIG. 4 is a flowchart illustrating a method for generating relation information from unstructured text according to an embodiment of the disclosure.

As illustrated in FIG. 4, the method 400 includes one or more blocks illustrating a method of generating relational information from unstructured text. The method 400 may be described in the general context of computer executable instructions. Generally, computer executable instructions may include routines, programs, objects, components, data structures, procedures, modules, and functions, which perform functions or implement abstract data types.

The order in which the method 400 is described is not intended to be construed as a limitation, and any number of the described method blocks may be combined in any order to implement the method 400. Additionally, individual blocks may be deleted from the methods without departing from the spirit and scope of the subject matter described herein. Furthermore, the method 400 may be implemented in any suitable hardware, software, firmware, or combination thereof.

In operation 401, a processor 207 included in an information processing system 205 may classify a text input which is received via I/O interface 209 by at least one application, into one or more categories. In an embodiment, the text input may include information in an unstructured text format. In an embodiment, the processor 207 may retrieve the text input from at least one application installed in a user device 203, where the text input includes at least one of a text message, a note, a notification and a Rich Content Service (RCS) message.

In operation 403, the processor 207 may extract one or more entities from the text input, based on the one or more classified categories. As an example, the one or more entities of the text input may provide important information or summary related to the text input. As an example, brand name, validity, offer amount and the like may be the one or more entities of the text input.

In operation 405, the processor 207 may determine a relationship possibility factor between the text input and at least one of or each of other classified text inputs stored in the information processing system, based on the corresponding categories associated with the text input and the other classified text inputs, and the information present in the text input and information present in the other classified text inputs. The relationship possibility factor is one of positive or negative. In an embodiment, the relationship possibility factor is determined using one or more machine learning techniques.

In operation 407, the processor 207 may generate structured relational information for a user associated with the information processing system 205, by associating the one or more entities extracted from the text input and other classified text inputs, when the relationship possibility factor is positive. In an embodiment, the structured relational information may include a composite view of the information present in the text input and the information present in at least one other classified text input, in a predefined intuitive display format.

In operation 409, the processor 207 may provide the structured relational information to the user in a relational sequence, based on a predefined relation criteria. In an embodiment, generating the structured relational information and providing the structured relational information to the user in the relational sequence may be based on a user profile and contextual parameters. The structured relational information is provided to the user in a predefined intuitive display format. Thereafter, the processor 207 may update the structured relational information, in real-time, when the information processing system 205 receives one or more updates related to the information present in at least one of the text input and the other classified text inputs, which contribute to generation of the structured relational information.

Figure 5:
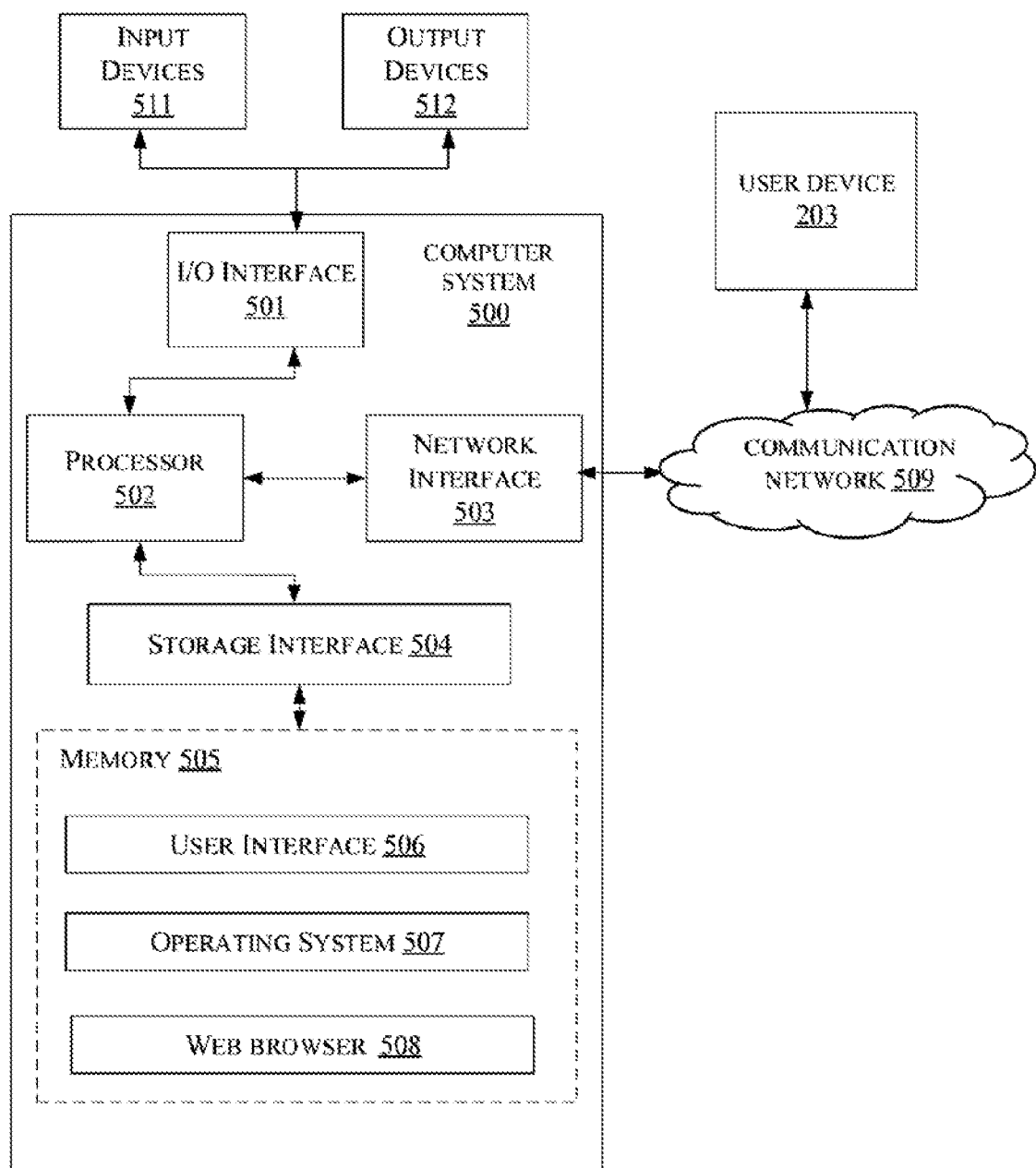
FIG. 5 is a block diagram of an electronic device for generating relation information from unstructured text according to an embodiment of the disclosure.

FIG. 5 is a block diagram of an electronic device for generating relation information from unstructured text according to an embodiment of the disclosure.

In an embodiment, the computer system 500 may correspond to an information processing system 205 or an electronic device that is used for generating relational information from unstructured text. The computer system 500 may include a central processing unit ("CPU" or "processor") 502. The processor 502 may include at least one data processor for executing program components for executing user or system-generated business processes. A user may include a person, a person using a device such as such as those included in this disclosure, or such a device itself. The processor 502 may include specialized processing units such as integrated system (bus) controllers, memory management control units, floating point units, graphics processing units, digital signal processing units, etc.

The processor 502 may be disposed in communication with input devices 511 and output devices 512 via I/O interface 501. The I/O interface 501 may employ communication protocols/methods such as, without limitation, audio, analog, digital, stereo, IEEE-1395, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 501, computer system 500 may communicate with input devices 511 and output devices 512.

In an embodiment, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 503 and the communication network 509, the computer system 500 may communicate with a user device 203. The communication network 509 may be implemented as one of the different types of networks, such as intranet or Local Area Network (LAN) and such within the organization. The communication network 509 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc. In an embodiment, the processor 502 may be disposed in communication with a memory 505 (e.g., RAM, ROM, etc.) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1395, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, a user interface 506, an operating system 507, a web browser 508 etc. In an embodiment, the computer system 500 may store user/application data, such as the data, variables, records, etc. as described in this disclosure. Such databases may be implemented as fault-tolerant, relational, scalable, secure databases such as Oracle or Sybase.

Operating system 507 may facilitate resource management and operation of computer system 500. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like. User interface 506 may facilitate display, execution, interaction, manipulation, or operation of program components through textual or graphical facilities. For example, user interfaces may provide computer interaction interface elements on a display system operatively connected to computer system 500, such as cursors, icons, check boxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

Computer system 500 may implement web browser 508 stored program components. Web browser 508 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX, DHTML, ADOBE® FLASH®, JAVASCRIPT®, JAVA®, Application Programming Interfaces (APIs), etc. Computer system 500 may implement a mail server stored program component. The mail server may be an Internet mail server such as Microsoft Exchange, or the like. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In an embodiment, the computer system 500 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

The present disclosure classifies the text input based on intelligent template converting technique, which dynamically converts a text input of any format into a template, and enables classification of the text input into different categories. Therefore, the present disclosure eliminates the limitation of classifying and processing only the text input of a known or a predefined format, which in turn eliminates the tedious process of configuring each new text format frequently.

The present disclosure enables recommending the best/most appropriate content such as offers, information, One Time Passwords (OTP), reminders and the like, to the user by performing relational association between two text inputs. Such recommendation based on relational association ensure usage of the content such as offers, OTPs and the like, by the user, which otherwise would have been ignored.

The present disclosure recommends that best/most appropriate content to the user in an intuitive display format, in a relational sequence, based on a predefined relation criteria. The intuitive display format provides a link between the recommended content, that helps in easy understanding and usage of the content. As an example, when the reminder of flight details is provided to the user, offers related to cab are integrated into the display card to create a composite view, such that, the user may easily select the applicable cab booking offers from the display card itself. This eliminates the tedious process of going through the clutter of messages or clutter of offers to identify the offers applicable for availing a particular offer. Additionally, the relational sequence is derived based on the predefined relation criteria. The relational sequence ensures that the recommended content is provided to the user at the appropriate time to ensure maximum and best usage of the recommended content.

The present disclosure performs consolidates content from across multiple applications installed in the user device and provides recommendation based on contextual and relational analysis, which helps in accurate relational recommendations.

The present disclosure updates the structured relational information provided to the user, in real-time, based on one or more updates received by the information processing system. Such updated structured relational information ensures that the user is looking at the most recent information and also ensures that the recommended content is in accordance with the updated information.

A description of an embodiment with several components in communication with each other does not imply that all such components are required. On the contrary a variety of optional components are described to illustrate the wide variety of possible embodiments of the disclosure. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

The specification has described a method and a system for generating relational information from unstructured text. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries may be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the following claims.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of generating structured relation information in an electronic device, the method comprising:
   receiving, by at least one application installed on the electronic device, a first text input from a first device external to the electronic device;
   converting a format of the first text input into a template format;
   inputting the first text input in the template format to a neural network to obtain at least one category of the first text input;
   classifying the first text input into the at least one category;
   extracting, from the first text input, a first entity representing a context of the first text input, based on the at least one category of the first text input that is obtained via the neural network;
   detecting a first keyword from the first text input and a second keyword from at least one second text input previously stored in the electronic device or a server;
   determining an association between the first keyword and the second keyword;
   determining whether a relation factor is positive between the first text input and the at least one second text input, based on the association between the first keyword and the second keyword;
   generating, based on the relation factor being positive, structured relation information by associating the first entity extracted from the first text input, with a second entity extracted from the at least one second text input received from a second device external to the electronic device; and
   displaying the structured relation information on the electronic device,
   wherein the classifying the first text input further comprises:
   performing random sampling on the first text input to obtain a subset of the first text input;
   performing vector quantization on embeddings of the first text input to obtain quantized embeddings; and
   inputting the subset of the first text input and the quantized embeddings to an embedding layer of the neural network to obtain a classification of the first text input.

2. The method of claim 1, wherein the at least one category of the first text input comprises at least one of a schedule reminder, an offer associated with service or products, a transaction, a greeting, an offering of information, a request, and an acknowledgment.

3. The method of claim 1, wherein the detecting the first keyword from the first text input and the second keyword from the at least one second text input comprises determining the first keyword based on a first text detected from the first text input, a first synonym corresponding to the first text, or a first word vector generated from word embeddings with the first text; and
determining the second keyword based on a second text detected from the at least one second text input, a second synonym corresponding to the second text, or a second word vector generated from word embeddings with the second text.

4. The method of claim 1, wherein the determining the relation factor further comprises
   determining the relation factor based on a mapping table,
   wherein the mapping table comprises at least one category association between the at least one category of the first text input and other categories derived by classifying the at least one second text input.

5. The method of claim 1, wherein the extracting the first entity from the first text input comprises, determining the relation factor between the first text input and the at least one second text input, based on at least one category association between the first keyword and the second keyword and a statistical analysis of a user's usage of the at least one application in the electronic device over a predetermined period of time, and
   wherein the generating the structured relation information comprises generating the structured relation information based on the relation factor.

6. The method of claim 1, wherein the displaying the structured relation information comprises
   displaying the structured relation information based on predefined relation criteria,
   wherein the predefined relation criteria comprises at least one of a time, a location of a user of the electronic device, an event extracted from the first text input, or an amount of money extracted from the first text input.

7. The method of claim 6, wherein the displaying the structured relation information based on the predefined criteria comprises
   displaying the structured relation information based on a time sequence related to the first text input or the at least one second text input.

8. The method of claim 1, wherein the structured relation information comprises information extracted from the first text input and the at least one second text input.

9. The method of claim 1, the first text input is classified by the at least one application installed on the electronic device, and
   wherein the method further comprises providing, based on the structured relation information and a current time, suggestion information related to the at least one application in the electronic device.

10. The method of claim 1, wherein the first entity comprises at least one of:
    appointment information included in the first text input associated with an appoint reminder,
    booking information included in the first text input associated with a booking application,
    time information included in the first text input,
    location information included in the first text input,
    contact information included in the first text input,
    coupon information included in the first text input,
    payment information included in the first text input,
    delivery information included in the first text input,
    transportation information included in the first text input,
    product provider information included in the first text input, product information included in the first text input,
service provider information included in the first text input, or
service information included in the first text input.

11. The method of claim 1, further comprising:
updating, in real-time, the structured relation information upon receiving information included in the first text input or the at least one second text input.

12. The method of claim 1, wherein the first text input is classified by a plurality of applications installed on the electronic device, and
wherein among the plurality of applications, an application associated with the second text input is different from an application associated with the first text input.

13. The method of claim 1, wherein the first text input is classified by the at least one application installed on the electronic device, and
wherein the at least one application comprises at least one of a text message application, a chat application, a note application, a memo application, a word-processor application, an alarm application, or a Rich Content Service (RCS) message application.

14. The method of claim 1, wherein the displaying the structured relation information comprises displaying the structured relation information based on a user profile of a user of the electronic device and contextual parameters.

15. The method of claim 14, wherein the user profile comprises at least one of a location of the user, user preferences, application usage statistics, a name of the user, or a schedule of the user.

16. The method of claim 14, wherein the contextual parameters comprise at least one of a location, a schedule, a validity, events of services or products, a name of a person, or predefined statements which are included in the first text input and the at least one second text input.

17. An apparatus for generating structured relation information, the apparatus comprising
an input and output interface configured to receive a first text input via at least one application; and
a processor configured to:
convert a format of the first text input into a template format,
input the first text input in the template format to a neural network to obtain at least one category of the first text input,
classify the first text input received from a first device external to the apparatus, into the at least one category,
extract, from the first text input, a first entity representing a context of the first text input, based on the at least one category of the first text input that is obtained via the neural network,
detect a first keyword from the first text input and a second keyword from at least one second text input previously stored in the apparatus or a server,
determine an association between the first keyword and the second keyword,
determine whether a relation factor between the first text input and the at least one second text input is positive, based on the association between the first keyword and the second keyword, and
generate, based on the relation factor being positive, structured relation information by associating the first entity extracted from the first text input, with a second entity extracted from at least one second text input received from a second device external to the apparatus,
wherein the input and output interface is further configured to display the generated structured relation information,
wherein the classifying the first text input further comprises:
performing random sampling on the first text input to obtain a subset of the first text input;
performing vector quantization on embeddings of the first text input to obtain quantized embeddings; and
inputting the subset of the first text input and the quantized embeddings to an embedding layer of the neural network to obtain a classification of the first text input.

* * * * *